United States Patent
Morimoto et al.

(10) Patent No.: US 9,778,077 B2
(45) Date of Patent: Oct. 3, 2017

(54) OPTICAL FIBER SENSOR DEVICE

(71) Applicant: HITACHI, LTD., Tokyo (JP)

(72) Inventors: Yoshitaka Morimoto, Tokyo (JP); Takahiro Kurokawa, Tokyo (JP); Koichi Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/106,885

(22) PCT Filed: Feb. 28, 2014

(86) PCT No.: PCT/JP2014/055081
§ 371 (c)(1),
(2) Date: Jun. 21, 2016

(87) PCT Pub. No.: WO2015/129028
PCT Pub. Date: Sep. 3, 2015

(65) Prior Publication Data
US 2017/0219390 A1    Aug. 3, 2017

(51) Int. Cl.
*G01D 5/00* (2006.01)
*G01D 5/353* (2006.01)

(52) U.S. Cl.
CPC ................ *G01D 5/35316* (2013.01)

(58) Field of Classification Search
CPC ................ G01D 5/35316
USPC ............. 250/227.14, 237 G, 237 R
See application file for complete search history.

(56) References Cited

U.S. PATENT DOCUMENTS

2007/0280605 A1* 12/2007 Mendoza ........... G01D 5/35383
                                                            385/92
2015/0204748 A1* 7/2015 Carr ...................... G01D 5/268
                                                            356/519

FOREIGN PATENT DOCUMENTS

JP    11-295153 A    10/1999

OTHER PUBLICATIONS

International Search Report of PCT/JP2014/055081 dated May 20, 2014.

* cited by examiner

*Primary Examiner* — Seung C Sohn
(74) *Attorney, Agent, or Firm* — Mattingly & Malur, PC

(57) ABSTRACT

It is made possible to amplify signal light of an optical fiber sensor and to perform measurement in a long distance. At least one of a plurality of core wires in a multicore optical fiber is used as a signal-light propagating core wire 133 and the other is used as a reference-light propagating core wire 134. Also, homodyne detection of signal light and reference light reflected by an FBG sensor unit 132 arranged in each measurement point is performed. Thus, signal light is amplified. In order to make a difference between optical path lengths of the signal light and the reference light equal to or smaller than a coherence length, an optical path-length adjustment unit including a piezoelectric element or the like is arranged in an optical path of the reference light.

12 Claims, 20 Drawing Sheets

OPTICAL FIBER SENSOR DEVICE

TECHNICAL FIELD

The present invention is related to a device and a method of measuring a state such as a deformation or a temperature of an object to be measured with an optical fiber Bragg grating (FBG) sensor unit provided in each measurement point of an optical fiber.

BACKGROUND ART

Recently, there is a need for measuring a state such as a temperature, a deformation, or pressure of an object to be measured with a sensor. Among these, an optical fiber FBG sensor is focused because of practical advantages of an optical fiber such as non-inductivity, an explosion proof property, and corrosion resistance. Here, a structure of a conventional FBG sensor is illustrated in FIG. 21. An FBG is an optical device in which a refractive index is periodically changed in a longitudinal direction of a core part 2101 of an optical fiber and a diffraction grating 2103 is formed. The FBG has a property of reflecting only an optical signal of a predetermined wavelength by Bragg reflection. A wavelength of a reflected optical signal (Bragg wavelength) $\lambda_B$ is expressed by the following expression (1) using effective refraction $n_{eff}$ of an optical fiber core and a width $\Lambda$ of a refractive index distribution.

$$\lambda_B = 2 n_{eff} \Lambda \qquad \text{[Math 1]}$$

In the conventional FBG sensor, there is a problem that it is not possible to improve an SNR of Bragg reflection even when a light quantity of a light source is increased and that it is not possible to secure an SNR adequate for multipoint measurement in a case of measuring a state of a plurality of positions of an object to be measured.

In PTL 1, a method to improve accuracy of measurement of a wavelength change by making reflection light (signal light) from a measuring FBG sensor and reflection light (reference light) from a reference FBG sensor interfere with each other and by detecting a beat signal corresponding to a wavelength difference between the two and to measure a state (temperature or deformation) of an object to be measured is disclosed.

CITATION LIST

Patent Literature

PTL 1: JP 11-295153 A

SUMMARY OF INVENTION

Technical Problem

In PTL 1, signal light and reference light are made to interfere with each other but the interference is not for improvement of an SNR of Bragg reflection. On the other hand, there is homodyne detection as a method of amplifying signal light by using interference of light. However, in a case of performing multipoint measurement by actually using homodyne detection, wavelengths of signal light and reference light need to be identical in order to acquire interference light. Also, it is necessary to fix a phase difference between the two to around 0. However, when a signal-light propagating core wire and a reference-light propagating core wire are in different environments, an amount of change is different between Bragg wavelengths of the two. Thus, wavelengths of signal light and reference light do not become identical. Moreover, since an expansion/contraction amount varies among core wires, there is a problem that optical path lengths of the signal light and the reference light vary, a phase difference does not become around 0, and it is not possible to acquire an interference signal. Also, even when the interference signal is acquired, an output signal is not stable. Thus, it is not practical.

The present invention is provided in view of the forgoing problems and is to provide an optical fiber sensor with which it becomes possible to realize a constant signal light amplification factor by controlling generation of an optical path length difference between signal light and reference light due to an environmental change and removing an influence of a phase difference between the signal light and the reference light on a sensor output.

Solution to Problem

In the present invention, a signal-light propagating core wire and a reference-light propagating core wire are brought into one by utilization of a multicore fiber or the like, whereby the signal-light propagating core wire and the reference-light propagating core wire are placed in the same environment at various measurement points and a change of a Bragg wavelength generated by an environmental change is made substantially identical between signal light and reference light. Thus, it becomes possible to make the signal light and the reference light interfere with each other even when the Bragg wavelength changes. Also, a difference in an expansion/contraction amount between the signal-light propagating core wire and the reference-light propagating core wire due to an environmental change is eliminated. That is, a variation of a wavelength difference and a variation of an optical path length difference between the signal light and the reference light due to an environmental change are controlled, the signal light and the reference light are multiplexed, and an interference signal is generated.

An optical fiber sensor device of the present invention includes: a light source; an optical fiber sensor which includes a plurality of core wires arranged substantially in parallel and in which at least one core wire is used for signal light propagation, at least one other core wire is used for reference light propagation, FBG sensor units are provided in a plurality of places in a longitudinal direction, and a pair of FBGs having an identical Bragg wavelength is formed in the signal-light propagating core wire and the reference-light propagating core wire in each of the FBG sensor units; an interference optical system configured to multiplex signal light reflected from each of the FBG sensor units through the signal-light propagating core wire and reference light reflected through the reference-light propagating core wire and to generate a plurality of pieces of interference light with different phase relationships; a detection unit configured to detect the plurality of pieces of generated interference light; and a calculation unit configured to calculate an output of the detection unit and to generate a signal indicating intensity of the signal light.

In one reference-light propagating core wire, FBGs the number of which is smaller than that of FBGs formed in one signal-light propagating core wire are formed. A reflectivity of the FBGs formed in the signal-light propagating core wire is less than that of the FBGs formed in the reference-light propagating core wire. For example, it is possible to set the number of reference-light propagating core wires to be equal to or larger than the number of FBG sensor units and to form one FBG in the one reference-light propagating core wire.

In the following, detail means will be described. When an optical path length difference between signal light and reference light is not substantially 0 due to a factor other than an environmental factor (such as FBG processing accuracy or laying method), an optical path length of reference light is made identical to that of signal light and interference light is generated in a manner described in (1) to (4).

(1) For example, in a case where a wavelength-variable laser is used as a light source, an actual coherence length of laser light is equal to or longer than a maximum value of an optical path length difference between signal light and reference light which difference changes due to thermal expansion or oscillation of an optical fiber. Also, this coherence length is longer than an optical path length difference between signal light and reference light which difference is generated in production of an FBG sensor provided for each of signal light propagation and reference light propagation or laying of an optical fiber.

Accordingly, in a case of using a wavelength-variable laser as a light source, that is, in a state in which a coherence length of laser light is long, it is possible to easily adjust an optical path length difference between signal light and reference light. Also, since it is not necessary to scan a reference light mirror, it is possible to prevent a decrease of an SNR due to a deviation in an optical axis of reference light.

(2) For example, in a case of using a high-coherence light source as a light source, a piezoelectric element such as a PZT element that modulates a position of a mirror is used as an optical path-length adjustment unit and fast modulation of an optical path length of reference light is performed for a fine adjustment thereof. Here, high coherence indicates that a coherence length is equal to or larger than a maximum value of an optical path length difference after a change in optical path lengths of signal light and reference light which difference is generated due to thermal expansion, oscillation, laying of a sensor, and accuracy of a processed position of an FBG in an optical fiber. Also, more specifically, a high-coherence light source is a light source having a coherence length equal to or longer than 10 μm and is equal to or shorter than 1 km.

Accordingly, since an angle of reference light reflected by a mirror does not change even when the mirror is inclined in modulation of a position of the mirror, it is possible to prevent a decrease in interference efficiency of signal light and reference light.

(3) For example, when a broadband light source such as supercontinuum (SC) light or a super luminescent diode (SLD) is used as a light source, a coherence length of laser light is equal to or shorter than an optical path length difference between signal light and reference light which difference is generated due to production of an FBG sensor or laying of an optical fiber. Thus, it is necessary to accurately make an optical path length of reference light identical to that of signal light. As an optical path-length adjustment unit, a configuration in which a coarse adjustment of an optical path length of reference light is performed by driving of a mirror with a moving stage or the like, a fine adjustment of a position of the mirror is then performed with a piezoelectric element, and the optical path length of the reference light is made identical to that of signal light is included.

Accordingly, since interference efficiency of signal light and reference light is not decreased, it is possible to amplify signal light.

(4) For example, in a case of using a low-coherence light source as a light source, an optical path-length adjustment unit perform a coarse adjustment by moving a position of a corner cube prism by driving of a movable stage and performs a fine adjustment of an optical path length of reference light with a piezoelectric element that modulates a position of the corner cube prism. Here, low coherence indicates that a coherence length is equal to or shorter than a maximum value of an optical path length difference after a change in optical path lengths of signal light and reference light which difference is generated by thermal expansion, oscillation, or laying of a sensor in an optical fiber.

Accordingly, since an angle of reference light retroreflected by the corner cube prism does not change even when the corner cube prism is inclined due to driving, it is possible to prevent a decrease in interference efficiency of signal light and reference light.

(5) For example, a multicore optical fiber including a plurality of core wires arranged in parallel is used as an optical fiber.

Accordingly, since it is possible to arrange at least one of the plurality of core wires for signal light propagation and the other for reference light propagation and to arrange an FBG sensor in each measurement point, a change in an optical path length difference between signal light and reference light is small even when a deformation is generated in an optical fiber due to a temperature or oscillation. Thus, it is possible to prevent a decrease in interference efficiency of signal light and reference light.

(6) For example, a ribbon optical fiber in which a plurality of core wires is arranged in parallel is used as an optical fiber.

Accordingly, in addition to an effect equivalent to that in (5) described above, it is possible to provide an optical fiber sensor with a low price since a ribbon optical fiber is mass-produced for a use of communication and has a lower price than a unique optical fiber.

(7) For example, a plurality of FBGs with different Bragg wavelengths is arranged in an optical fiber in which a plurality of core wires is arranged substantially in parallel.

Accordingly, a wavelength band of a broadband light source or a single wavelength-swept light source can be used effectively. Thus, it becomes possible to measure a state of an object to be measured at a plurality of places.

(8) For example, an optical fiber having a polarization maintaining property is used as an optical fiber in which a plurality of core wires is arranged substantially in parallel.

Accordingly, since it is possible to control disturbance in a polarized state due to external disturbance, it is possible to prevent a decrease in interference efficiency of signal light and reference light.

Advantageous Effects of Invention

By utilization of an optical fiber FBG sensor of the present invention, it is possible to control, at various measurement points, a variation of a wavelength difference and a variation of an optical path length difference between signal light and reference light due to an environmental change and to eliminate an influence of a phase difference between the signal light and the reference light on a sensor output. Thus, it is possible to acquire interference light stably.

Accordingly, it is possible to acquire an amplified signal and to increase a measurable distance, whereby it is possible to provide an optical fiber sensor device suitable for measurement of a plurality of positions.

A problem, configuration, and effect other than what has been described above will be disclosed in a description of the following embodiments.

DESCRIPTION OF EMBODIMENTS

In the following, embodiments of the present invention will be described with reference to the drawings.

First Embodiment

Figure 2:
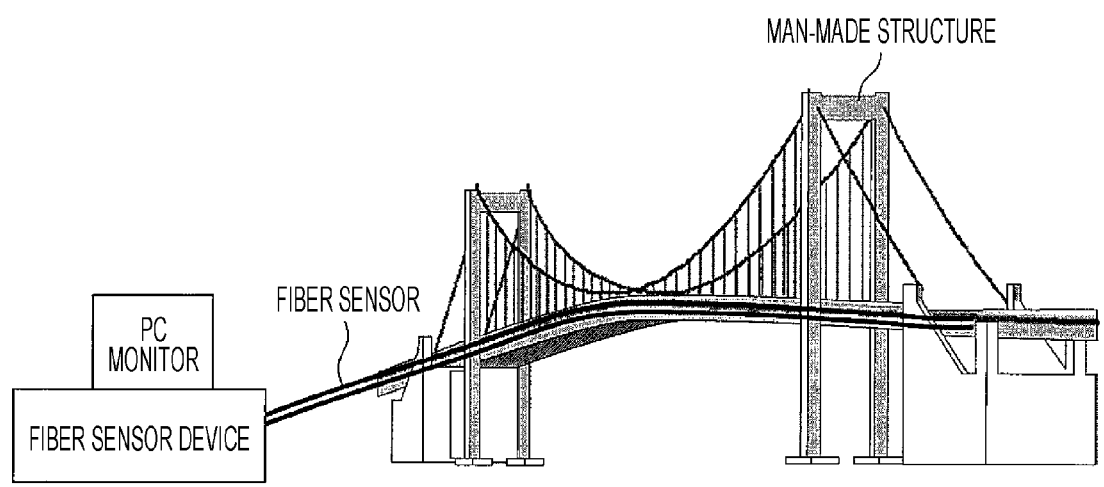
FIG. 2 is a schematic view illustrating an application example of an optical fiber sensor.

For example, as illustrated in an outline in FIG. 2, an optical fiber sensor device of the present embodiment uses an optical fiber as a sensor of measuring a state of a structure and accurately measures a deformation, pressure, or a temperature in a longitudinal direction of a predetermined position of the structure.

Figure 1:
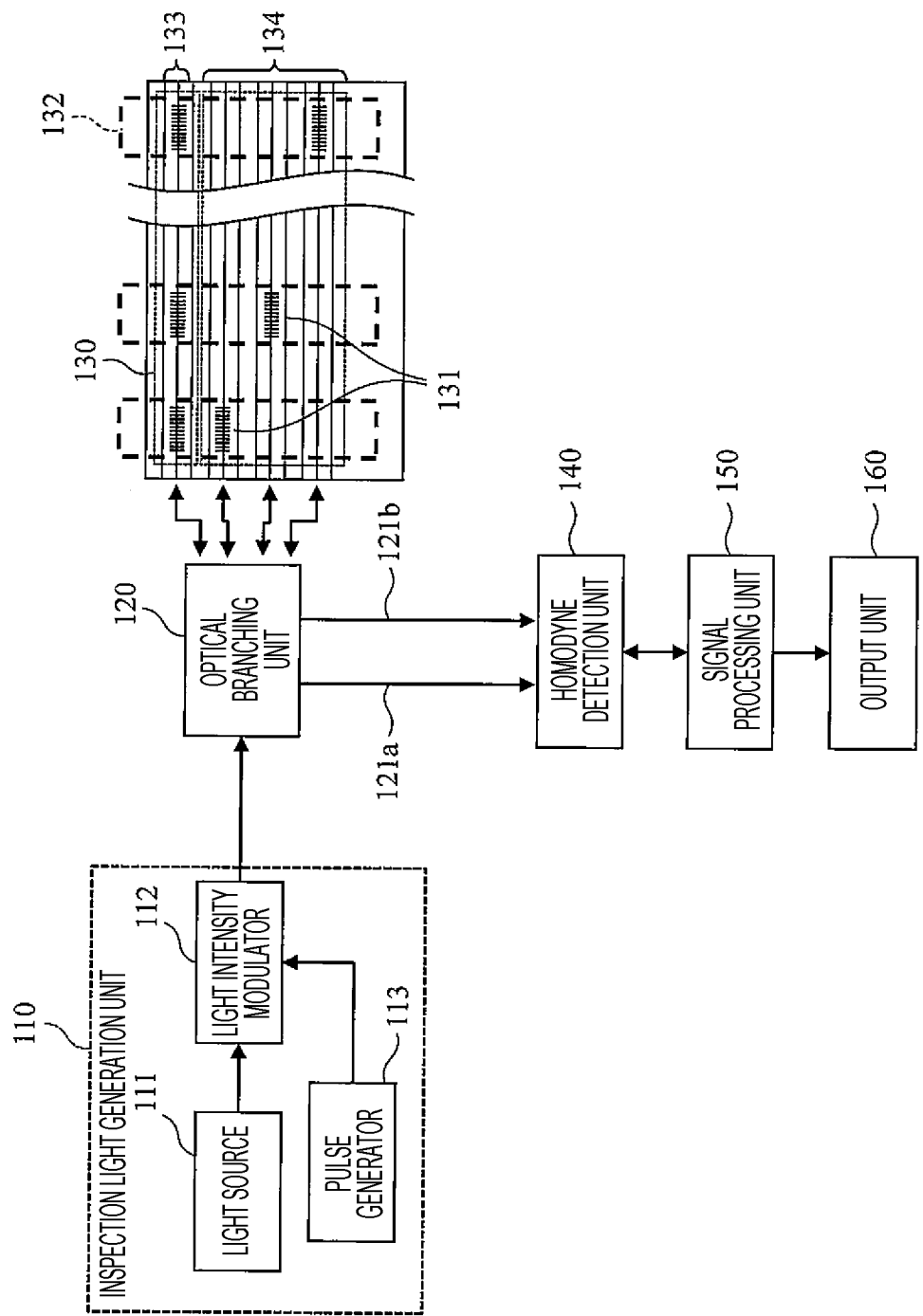
FIG. 1 is a schematic view illustrating a whole configuration example of an optical fiber sensor device.

FIG. 1 is a schematic view illustrating a whole configuration of an optical fiber sensor device of the present embodiment. A device of the present embodiment includes an inspection light generation unit 110, an optical branching unit 120, an optical fiber sensor 130, a homodyne detection unit 140, a signal processing unit 150, and an output unit 160.

The inspection optical pulse generation unit 110 generates inspection pulse light. The inspection pulse light enters the optical fiber sensor 130 through the optical branching unit 120. The inspection light generation unit includes a light source 111, a light intensity modulator 112, and a pulse generator 113. Each of the light intensity modulator 112 and the optical pulse generator 113 has a function of generating short pulse light from continuous light generated by the light source 111.

Figure 3:
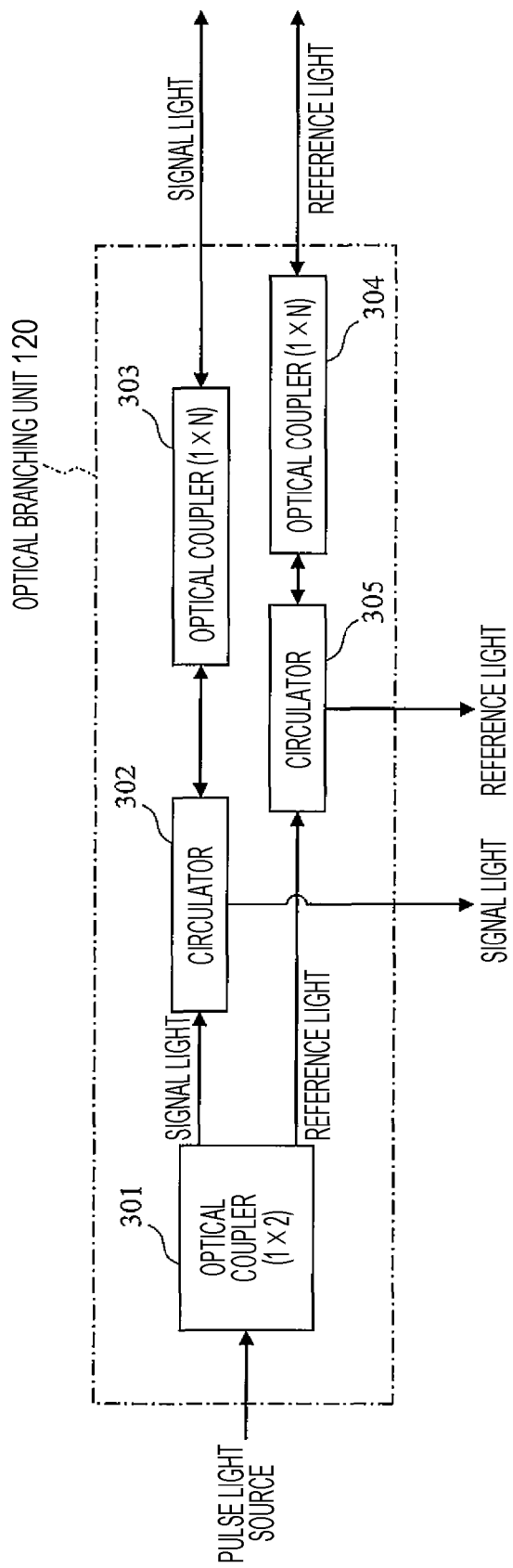
FIG. 3 is a block diagram illustrating a configuration example of an optical branching unit of an optical fiber sensor.

The optical branching device 120 splits light from the light source 111 into at least one piece of signal light and at least one piece of reference light and provides the split light to the plurality of core wires in the optical fiber sensor 130. In the optical branching device 120, after the light from the pulse light source is split with an optical coupler into two that are signal light and reference light, the signal light and/or reference light is split with the optical coupler into the intended number of pieces. In the present embodiment, for example, as illustrated in FIG. 3, after the light from the pulse light source is split with an optical coupler (1×2) 301 into two that are signal light and reference light, the reference light is split with an optical coupler (1×N) 304 into the intended number of pieces. Also, signal light and reference light returning from. an FBG arranged in each measurement place in the optical fiber sensor 130 are respectively propagated in a signal-light propagating optical fiber 121a and a reference-light propagating fiber 121b through different circulators 302/305 and are supplied to the homodyne detection unit 140.

The optical fiber sensor 130 is an optical fiber sensor including a plurality of core wires arranged in parallel, at least one thereof being signal-light propagating core wire 133 and the other being reference-light propagating core wire 134. In the optical fiber sensor 130, a plurality of measurement points is set. At each measurement point, an FBG sensor unit 132 is provided. In each FBG sensor unit 132, a pair of fiber Bragg gratings (FBG) 131 with an identical Bragg wavelength is formed in a signal-light propagating core wire 133 and a reference-light propagating core wire 134. The pair of FBGs 131 formed in each FBG sensor unit 132 is preferably arranged in a range of a coherence length of the light emitted from the light source 111.

Figure 4:
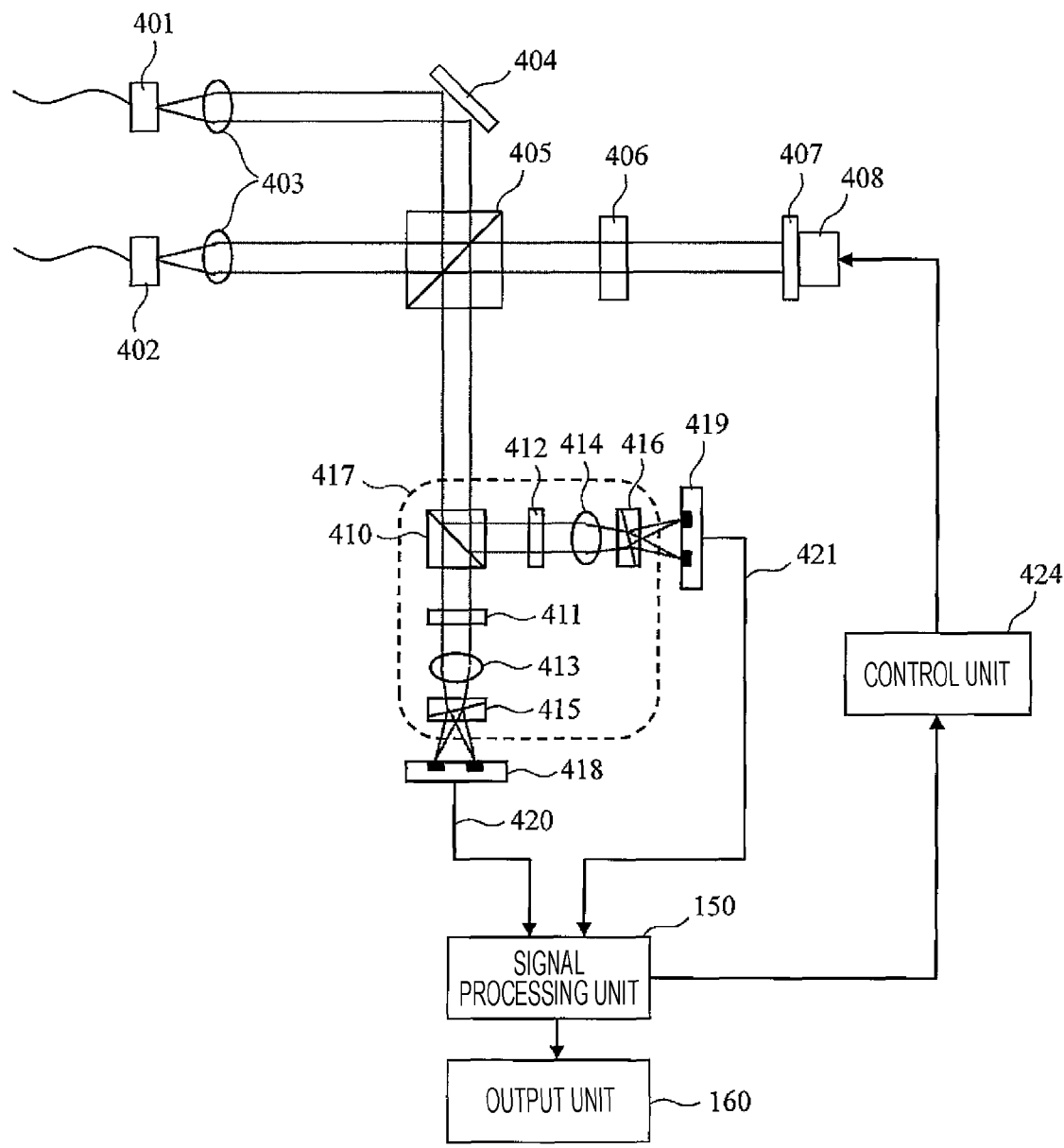
FIG. 4 is a schematic view illustrating a homodyne detection unit of an optical fiber sensor device.

FIG. 4 is a schematic view illustrating a basic configuration example of the homodyne detection unit 140. The signal light and the reference light are respectively emitted from a signal-light propagating optical fiber 401 and a reference-light propagating optical fiber 402. Each piece of emission laser light is converted into parallel light by a collimate lens 403. The signal light is reflected by a mirror 404 and enters a polarization beam splitter 405. On the other hand, the reference light is converted into parallel light and transmitted through the polarization beam splitter 405 and a λ/4 plate 406, whereby a polarization state thereof is converted from p polarization into circular polarization. Then, after being reflected by the mirror 407 mounted in a piezoelectric element (PZT element) 408 that is an optical path length fine-adjustment unit, the reference light enters the polarization beam splitter 405 with the polarization state being converted by the λ/4 plate 406 from the circular polarization into s polarization.

The signal light and the reference light are multiplexed by the polarization beam splitter 405 and synthetic light is generated. The synthetic light is guided to an interference optical system 417 including a half beam splitter 410, a λ/2 plate 411, a λ/4 plate 412, collecting lenses 413 and 414, and Wollaston prisms 415 and 416. The synthetic light that enters the interference optical system 417 is split into two that are transmitted light and reflection light by the half beam splitter 410. After being transmitted through the λ/2 plate 411 an optical axis of which is set at around 22.5° in a horizontal direction, the transmitted light is collected by the collecting lens 413. Then, polarization splitting is performed by the Wollaston prism 415. Thus, first interference light and second interference light are generated, a phase relationship between the two being antiphase. The first interference light and the second interference light are detected by a current differential-type photodetector 418 and a signal 420 corresponding to a difference in intensity therebetween is output.

On the other hand, after being transmitted through the λ/4 plate 412 an optical axis of which is set at around 45° in a horizontal direction, the light reflected by the half beam splitter 410 is collected by the collecting lens 414. Then, polarization splitting is performed by the Wollaston prism 416. Thus, third interference light and fourth interference light are generated, a phase relationship between the two being antiphase. Here, a phase of the third interference light is different for 90° from that of the first interference light. The third interference light and the fourth interference light are detected by a current differential-type photodetector 419 and a signal 421 corresponding to a difference in intensity therebetween is output. The signals 420 and 421 generated in such a manner are input into the signal processing unit 150 and calculated, whereby a signal proportional to amplitude of the signal light is acquired. A deformation, pressure, and a temperature of a man-made structure which are calculated based on this signal are displayed on the output unit 160.

Here, an operation principle of the interference optical system 417 will be described in detail with reference to numeric expressions. When amplitude of the signal light is $E_{sig}$, amplitude of the reference light is $E_{ref}$, and a Jones vector of synthetic light at time point of entering the interference optical system 417 is expressed by $$\begin{pmatrix} E_{sig} \\ E_{ref} \end{pmatrix},$$  [Math 2]

a Jones vector of synthetic light after transmission through the half beam splitter 410 and the λ/2 plate 411 is as follows.

$$\begin{pmatrix} 1/\sqrt{2} & -1/\sqrt{2} \\ 1/\sqrt{2} & 1/\sqrt{2} \end{pmatrix} \begin{pmatrix} E_{sig}/\sqrt{2} \\ E_{ref}/\sqrt{2} \end{pmatrix} = \frac{1}{2} \begin{pmatrix} E_{sig} - E_{ref} \\ E_{sig} + E_{ref} \end{pmatrix}$$  [Math 3]

After polarization of the synthetic light expressed by the expression (3) is split by the Wollaston prism 415 into a p polarization component and an s polarization component, differential detection is performed by a current differential-type photodetector 418. Thus, the detection signal 420 is expressed as follows.

$$I = \frac{1}{4}|E_{sig} + E_{ref}|^2 - \frac{1}{4}|E_{sig} - E_{ref}|^2$$
$$= |E_{sig}||E_{ref}|\cos(\theta_{sig} - \theta_{ref})$$  [Math 4]

Here, $\theta_{sig}$ and $\theta_{ref}$ are phases of when complex numbers $E_{sig}$ and $E_{ref}$ are expressed by a polar coordinate expression. For simplification, conversion efficiency of a detector is set to 1.

On the other hand, a Jones vector of the synthetic light reflected by the half beam splitter 410 and transmitted through the λ/4 plate 412 is as follows.

$$\begin{pmatrix} i/\sqrt{2} & 1/\sqrt{2} \\ 1/\sqrt{2} & i/\sqrt{2} \end{pmatrix} \begin{pmatrix} E_{sig}/\sqrt{2} \\ E_{ref}/\sqrt{2} \end{pmatrix} = \frac{1}{2} \begin{pmatrix} i(E_{sig} - iE_{ref}) \\ E_{sig} + iE_{ref} \end{pmatrix}$$  [Math 5]

After polarization of the synthetic light expressed by the expression (5) is split by the Wollaston prism 416 into a p polarization component and an s polarization component, differential detection is performed by the current differential-type photodetector 419. Thus, the detection signal 421 is expressed as follows.

$$Q = \frac{1}{4}|E_{sig} + iE_{ref}|^2 - \frac{1}{4}|E_{sig} - iE_{ref}|^2$$
$$= |E_{sig}||E_{ref}|\sin(\theta_{sig} - \theta_{ref})$$  [Math 6]

When the following calculation is performed by the signal processing unit 150 with respect to these outputs, an amplification signal that does not depend on a phase difference between signal light and reference light and that is proportional to intensity of the signal light is acquired.

$$I^2 + Q^2 = |E_{sig}|^2|E_{ref}|^2$$  [Math 7]

In such a manner, in the interference optical system 417, a signal that does not depend on a phase is acquired by generation and detection of four pieces of interference light with phases different from each other for 90°. However, in principle, when there are three pieces or more of generated interference light, a similar signal can be acquired regardless of the number of pieces of interference light. For example, by generating and detecting three pieces of interference light with phases different from each other for 60°, it is possible to acquire a signal identical to that expressed in the expression (7).

The signal processing unit 150 specifically includes a CPU, a memory (ROM or RAM), and the like and various functions are realized by a combination thereof. For example, a function of estimating a degree of interference in an interference signal of signal light and reference light, calculating an optical path length difference between the signal light and the reference light based on a result of the estimation, and determining an optical path-length adjustment unit to be used (described later) is included.

Figure 5:
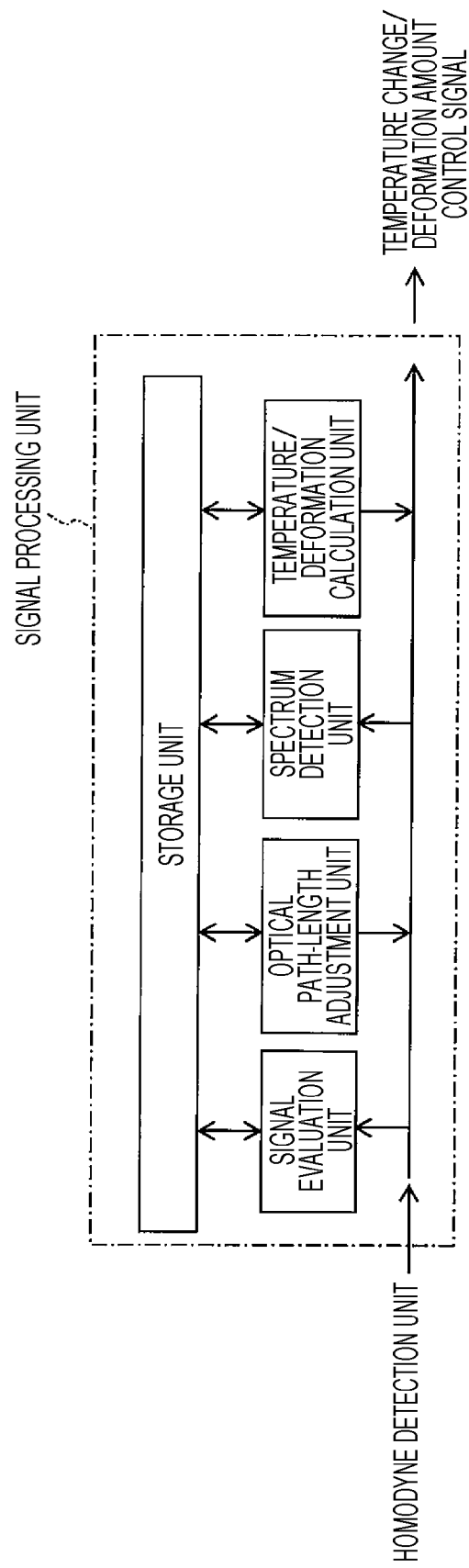
FIG. 5 is a block diagram illustrating a configuration example of a signal processing unit of an optical fiber sensor device.

FIG. 5 is a block diagram illustrating a configuration example of the signal processing unit 150. The signal processing unit 150 includes a signal evaluation unit, an optical path-length adjustment unit, a spectrum detection unit, a temperature/deformation calculation unit, and a storage unit. The signal evaluation unit has a function of acquiring a condition or the like in an adjustment of driving power or an optical length of a light source and calculating amplitude of interference light based on a multiplexed signal of signal light and reference light. The acquired information is stored into a storage unit. Moreover, signal data of reflection light is measured in each period of time and time-history data of a shift amount of a Bragg wavelength is acquired. The time-history data is transmitted to the storage unit and the spectrum detection unit. That is, Bragg wavelength variation signal data acquired at certain time t and Bragg wavelength signal data acquired temporally before/after the Bragg wavelength variation signal data are held in the storage unit. These pieces of data are transmitted to the spectrum detection unit.

The optical path-length adjustment unit is a processing unit of determining an adjustment unit to generate interference light and to optimize a degree of interference based on a result of evaluation of a multiplexed signal of signal light and reference light which result is acquired from the signal evaluation unit. That is, in order to make an optical path length of the reference light equivalent to that of the signal light, it is determined whether to perform a fine adjustment and/or a coarse adjustment of the optical path length of the reference light. Also, data related to a physical adjustment amount of the reference light with respect to each FBG is output to the storage unit and a control unit 424. Accordingly, an optical path length adjustment with respect to each FBG arranged in an intended measurement position is performed once and an absolute value thereof can be stored, for example, in a text format in the storage unit. Thus, in next measurement, a previous optical path length adjustment amount stored in the storage unit is referred to. When an adjustment amount is different from that in the previous time, a new adjustment amount is written over a file in the text format in the storage unit.

The spectrum detection unit calculates an FBG reflection center wavelength from a Bragg wavelength based on the data supplied by the storage unit and transfers the center wavelength data to the storage unit and the temperature/deformation calculation unit of the signal processing unit 150. Here, from the Bragg wavelength variation signal data acquired at certain time t and the Bragg wavelength signal data acquired before/after the Bragg wavelength variation signal data, the spectrum detection unit calculates an average shift amount of a Bragg wavelength in an adequately long period of time and transmits data of the average shift amount to the storage unit and the temperature/deformation calculation unit.

Based on information of the spectrum detection unit which information is read from the storage unit, the temperature/deformation calculation unit removes a shift amount due to temperature from the Bragg wavelength signal data and supplies a deformation amount of the object to be measured to the output unit 160. Also, the temperature/deformation calculation unit has a capability of displaying a graphic of a structure deformation in addition to a capability of executing high-speed calculation and can simultaneously supply graphic data of a deformation distribution condition or the like to the output unit 160.

Then, a method of performing multipoint measurement of an object to be measured by multiplexing signal light and reference light and amplifying a signal light by using interference of light with the above-described optical fiber sensor device will be described. As described in the configuration of the above optical fiber sensor device, in a method of amplifying signal light, the signal light and reference light are made to interfere with each other by a half beam splitter or the like. Then, two pieces of interference light are detected by two different detectors. Here, when a differential signal between outputs from the two detectors is removed, $2\eta (I_s \cdot I_r)^{1/2} \cos \Delta\phi$ is acquired and only an interference term is left. This is an output signal of homodyne detection. Here, $\eta$ is conversion efficiency of a detector, $I_s$ and $I_r$ are respectively intensity of signal light and that of reference light, and $\Delta\phi$ is a phase difference between the signal light and the reference light. Since an output of when the signal light is directly detected without utilization of the reference light is $2\eta \cdot I_s$, it becomes possible to make the output $(I_r/I_s)^{1/2} \cos \Delta\phi$ times larger by introduction of the reference light. Thus, when $I_r \gg I_s$, $\Delta\phi \approx 0$, it becomes possible to amplify a signal greatly.

Figure 6:
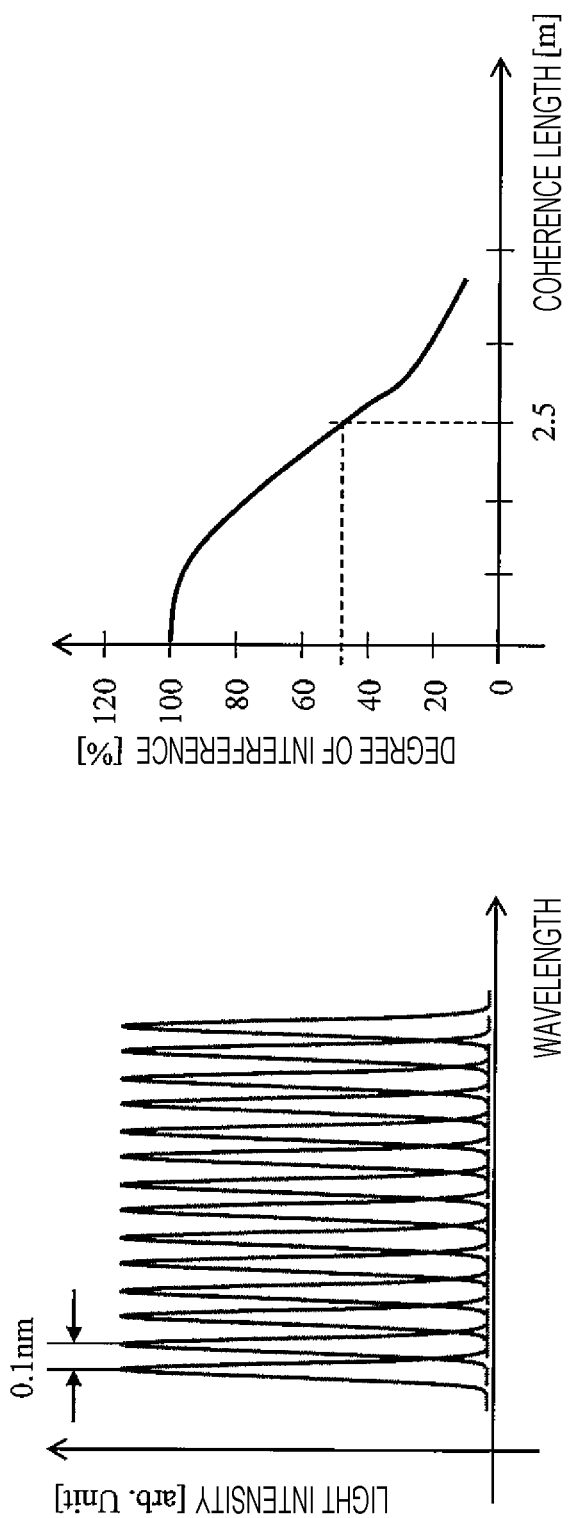
FIG. 6 is a view illustrating an example of a property of a light source.

FIG. 6 is a view illustrating an example of a property of a light source used in a method of evaluating a state (deformation) of a man-made structure which method is according to the present embodiment. A light source for evaluation is a single wavelength-swept light source that can emit light (continuous light) in an intended frequency and can change an oscillation wavelength (oscillation frequency) by adjusting a temperature or a driving current. As illustrated in FIG. 6, in the present embodiment, for example, alight source that has a narrow spectral linewidth being <10 MHz and that can change a wavelength by 0.1 nm is used. Accordingly, since a maximum coherence length is long and is, for example, around 2.5 m, it is possible to easily perform an optical path length adjustment in reference light and signal light and to amplify the signal light. Thus, measurement in a long distance becomes possible. Here, the maximum value of the coherence length is a value in a case where a degree of interference is 50% which case is illustrated in FIG. 6. Note that a coherence length of a light source for evaluation may be short but needs to be longer than an optical path length difference between the signal light and the reference light which difference is generated by FBG production or laying of a fiber.

Figure 7:
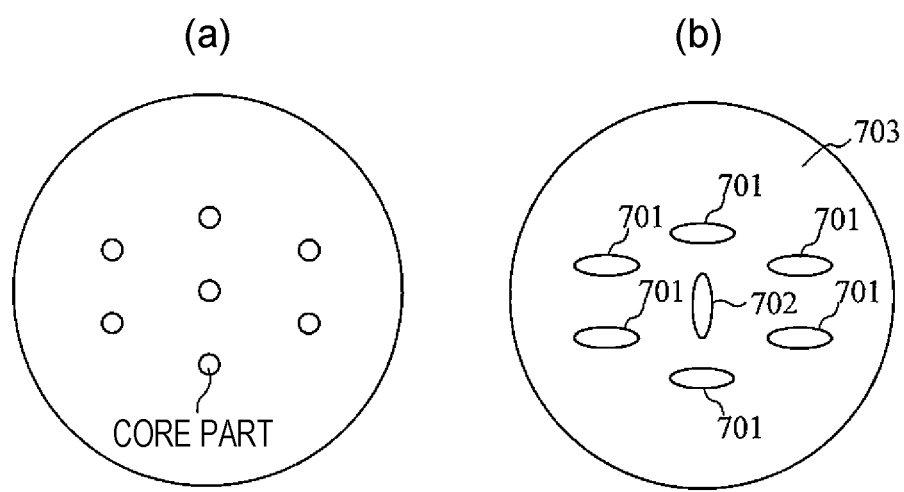
FIG. 7(a) and FIG. 7(b) are sectional views illustrating examples of an optical fiber including a plurality of core wires arranged in parallel.

FIG. 7(a) is a cross sectional view illustrating an example of an optical fiber that is used in sensing of a state (deformation) of a man-made structure and that includes a plurality of core wires arranged in parallel. An optical fiber used in a conventional FBG fiber sensor includes only one core for signal light propagation. However, in the present embodiment, as illustrated in FIG. 7(a), in a method of amplifying signal light without an influence of an environmental change, for example, one of a plurality of core wires in a multicore optical fiber is used for signal light propagation and the other core wire is used for reference light propagation. In this case, an optical path length difference between signal light and reference light reflected by FBG sensors arranged at each measurement point is smaller than a maximum value of a coherence length. Moreover, in the present embodiment, FBGs with an identical Bragg wavelength are arranged at an intended measurement point. The plurality of core wires of the multicore optical fiber is used for signal light propagation and reference light propagation and an FBG is provided in each of a signal-light propagating core wire and a reference-light propagating core wire at a measurement point, whereby the FBG in the signal-light propagating core wire and the FBG in the reference-light propagating core wire are placed in the same environment. Thus, the same influence is received from a state (deformation) of a man-made structure or an environmental temperature and wavelength shifts of Bragg wavelengths of the two become the same value. Thus, even when a Bragg wavelength of each of the signal light and the reference light changes due to an influence from an environment, the two can interfere with each other in the interference optical system 417.

Figure 8:
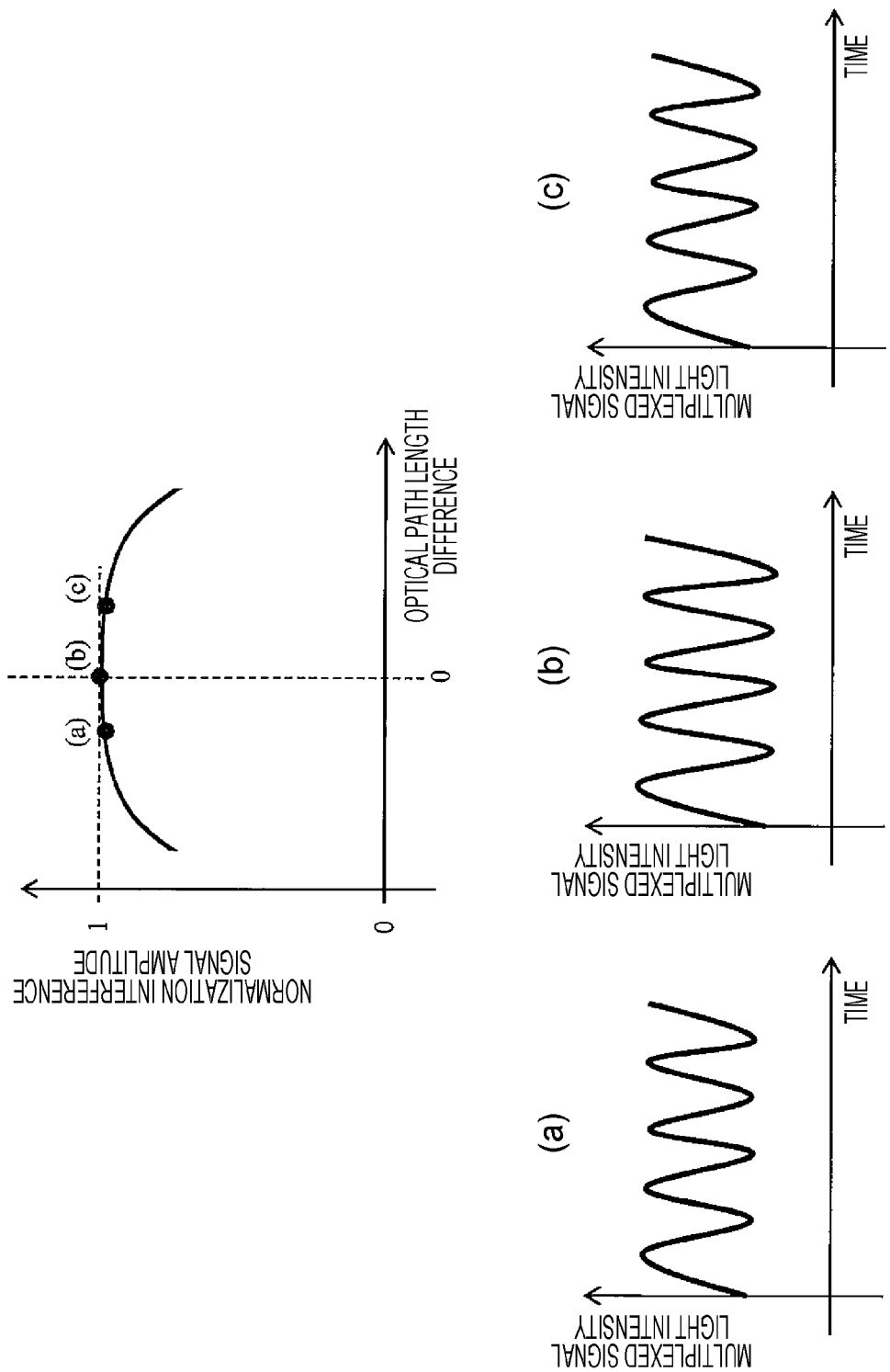
FIG. 8 is a schematic view illustrating an example of an optical path length difference between signal light and reference light and amplitude of an interference signal.

In amplification of a signal, an optical path length adjustment is performed in order to make the signal light and the reference light interfere with each other. In the optical path length adjustment, there are a coarse adjustment and a fine adjustment. Here, the fine adjustment indicates a length in a nanometer to micrometer order that can be adjusted by a piezoelectric element. FIG. 8 is a schematic view illustrating an optical path length difference between signal light and reference light and amplitude of an interference signal in the present embodiment using a high-coherence light source. An upper view in FIG. 8 is a schematic view illustrating interference signal amplitude with respect to an optical path length difference between signal light and reference light and three lower views are schematic views of an interference signal corresponding to three points (a), (b), and (c) in the upper view. In the present embodiment, since a light source with a long coherence length is used in the present embodiment, a coherence length is long. Thus, even when an optical path length difference in a several centimeters order is generated between signal light and reference light, the signal light and the reference light interfere with each other (FIG. 8(a), FIG. 8(b), and FIG. 8(c)). However, in order to increase a distance of the optical fiber sensor device, a fine adjustment of an optical path length is performed by the piezoelectric element 408 in such a manner as to be 90% or more of a peak value of amplitude (FIG. 8(b)).

A signal is actually amplified by homodyne detection and an increase in a distance of the optical fiber sensor device is examined. First, in the present embodiment, an FBG reflectivity in the signal-light propagating core wire and that in the reference-light propagating core wire are respectively set to 1% and 100% and FBGs in the signal-light propagating core wire are arranged at intervals of 2.5 km. In order to amplify weak signal light by reference light having high intensity, light emitted from a light source is split in such a manner that reference light intensity becomes around four times higher than signal light intensity. A Bragg wavelength of each FBG is set to 1550 nm in order to control a transmission loss. Also, a measurable distance in the present embodiment is determined with an SNR=15 dB, with which a peak of Bragg reflection can be accurately detected, as a reference.

Also, in order to observe a reflection spectrum from an arbitrary FBG and to perform deformation measurement of an intended place, a time division system is used in the present embodiment. The time division system is a method in which by a difference in time at which light emitted from the inspection light generation unit is reflected by each FBG and enters a photodetector, an FBG spectrum thereof is separated on a time axis and observed. For example, pulse light with a time width w is propagated in an optical fiber, reaches an FBG, is reflected by the FBG, and enters the detector. The light is detected by the detector in $\tau_n$ seconds after laser emission. It is possible to measure a reflection spectrum from an FBG in a position of $L=\tau_n c/(2n)$ when an optical fiber length between a laser emission opening, the detector, and the FBG is set to L, a refractive index thereof is set to n, and velocity of light is set to c. Thus, by measuring $\tau_n$, it is possible to observe only a reflection spectrum from an arbitrary FBG. Thus, in the signal processing unit 150 in FIG. 1, only a signal from a first measurement point is selectively received first. After a fine adjustment of an optical path length (described later) (FIG. 10) is performed, intended information is acquired. Then, separation is also performed by a difference in time with respect to the second, third, . . . and n-th measurement points, an adjustment is performed in a similar procedure, and information is acquired. Moreover, since it is possible to perform separation and observation on a time axis and, all FBGs can be also observed in the same reflection wavelength.

First, a relationship between signal light SNR of a conventional FBG sensor and a measurable distance (L) is expressed by the expression (8). It is understood that the SNR does not depend on incident intensity. That is, even when quantity of light of a light source is increased, it is not possible to improve an SNR of Bragg reflection. Here, the conventional FBG sensor is a sensor in which a plurality of FBGs is arranged in series in an optical fiber with a single core, which measures signal reflection light from each FBG by a time division system, and which does not use an interference phenomenon.

$$SNR = \frac{2R_{sig,FBG}e^{-2\alpha L}}{R(1-e^{-2\alpha L})}W \qquad [\text{Math 8}]$$

Here, $R_{sig,\ FBG}$ is an FBG reflectivity of a signal-light propagating core wire, $\alpha$ is a transmission loss of an optical fiber, and R is a rate of generation of Rayleigh-scattering light that is a noise. In the present embodiment, since a normal optical fiber for optical communication is used, $\alpha=0.046$/km (0.2 dB/km) and R=0.0022.

On the other hand, in a case where a phenomenon in which signal light is amplified by interference with reference light which phenomenon is according to the present embodiment is used, an SNR with respect to a measurement distance of a sensor is expressed by the following expression. It is understood that the SNR depends on incident light intensity of the signal light and the reference light.

$$SNR = \frac{2R_{sig,FBG}e^{-2\alpha L}}{R(1-e^{-2\alpha L})} + \frac{2R_{ref,FBG}e^{-2\alpha L}}{R(1-e^{-2\alpha L})} + e^{-2\alpha L}\sqrt{P_{sig} \cdot P_{ref} \cdot R_{sig,FBG} \cdot R_{ref,FBG}} \qquad [\text{Math 9}]$$

Here, $P_{sig}$ is incident light intensity with respect to the signal-light propagating core wire, $P_{ref}$ is incident light intensity with respect to the reference-light propagating core wire, $R_{sig,\ FBG}$ is an FBG reflectivity of the signal-light propagating core wire, and $R_{ref,\ FBG}$ is an FBG reflectivity of the reference-light propagating core wire.

Figure 9:
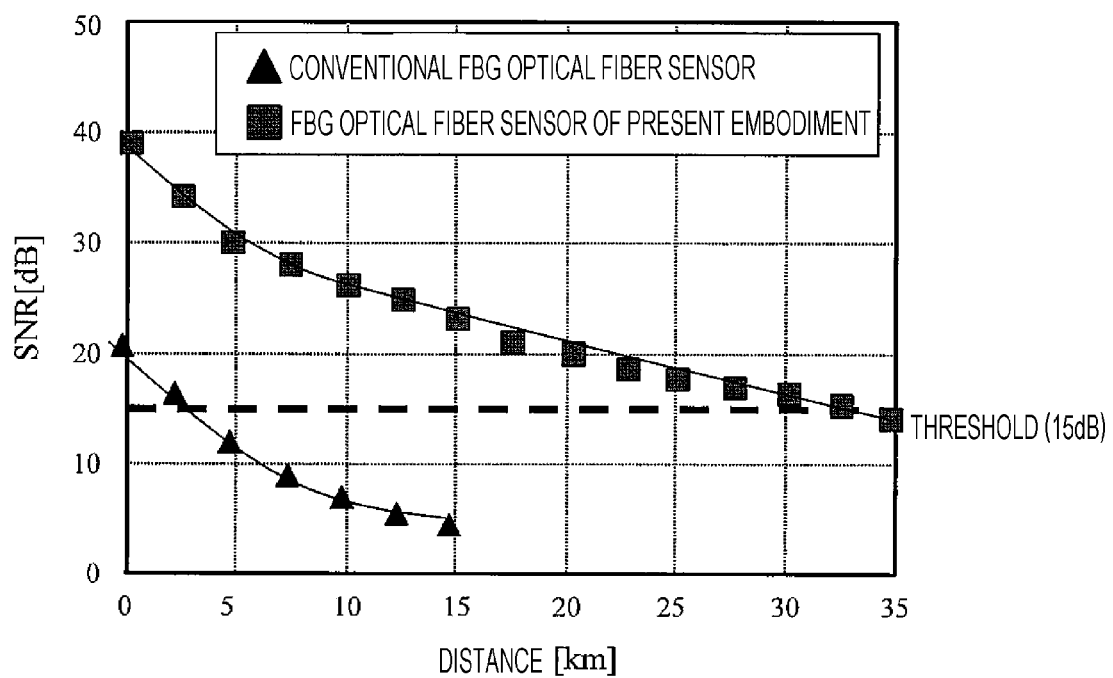
FIG. 9 is a view for comparison between a measurable distance of a conventional FBG sensor and that of an FBG sensor of the present invention.

FIG. 9 is a schematic view of an example of a result of comparison between a measurable distance of a conventional FBG sensor and that of the FBG sensor of the present embodiment. By utilization of the homodyne detection of the present embodiment, it is confirmed that an SNR is improved. It is also confirmed that a measurable distance of the present embodiment is increased to 32.5 km, which is around thirteen times of 2.5 km that is a measurable distance of the conventional FBG sensor, and that multipoint measurement can be performed.

Figure 10:
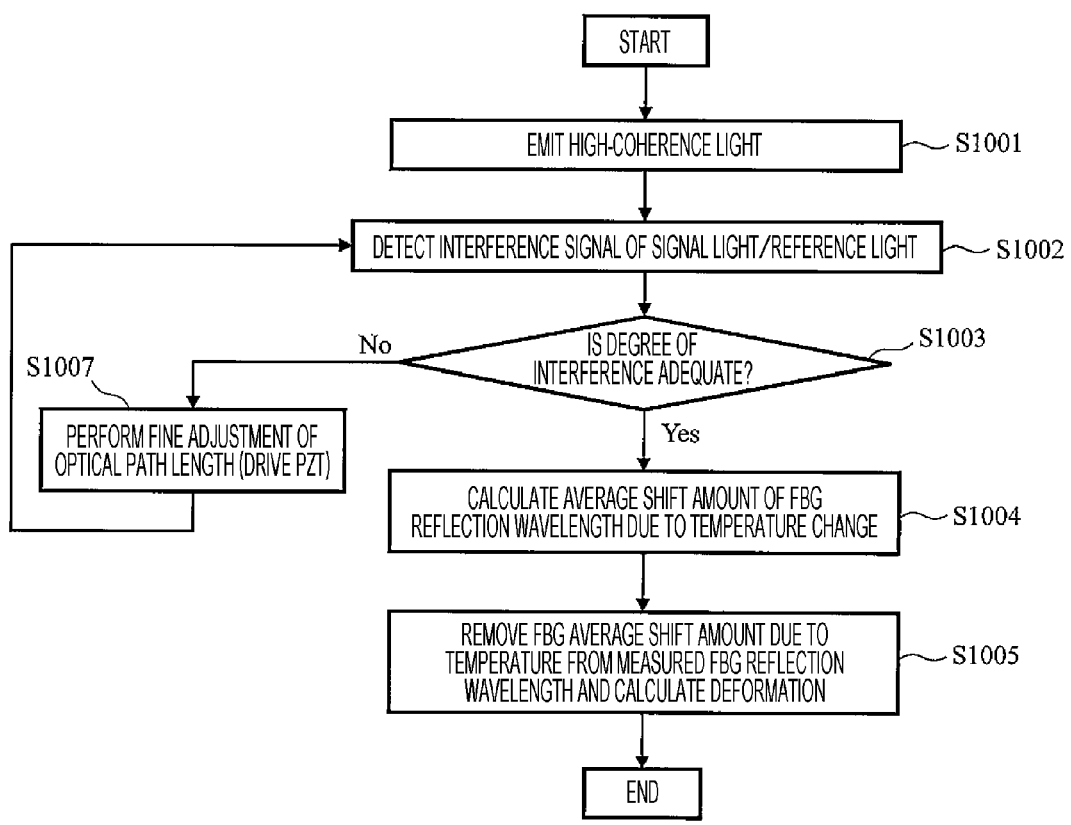
FIG. 10 is a flowchart for describing a procedure of measurement in a case where a high-coherence light source is used.

FIG. 10 is a flowchart illustrating a procedure of measurement including an operation of an optical path length adjustment in a case where a high-coherence light source is used. First, in step 1001, current is applied to the light source and a laser light is emitted. The laser light is supplied to the signal-light propagating core wire and the reference-light propagating core wire of the optical fiber sensor. Here, a light source that emits high coherence light is used as the light source. In step 1002, an interference signal of signal light and reference light from the optical fiber sensor is measured. In next step 1003, it is determined whether a degree of interference of the interference light is adequate. When it is determined that the degree is not adequate, the procedure goes to step 1007 in which the piezoelectric element 408 is driven, the mirror 407 is moved, and an adjustment is performed in such a manner that a difference between optical path lengths of the reference light and the signal light becomes substantially 0. Here, the determination whether the degree of interference is adequate is performed based on amplitude of an interference light signal and an optical path length is adjusted in such a manner that the amplitude becomes the highest. A degree of interference of the interference light an optical path length of which is adjusted in step 1007 is evaluated again. In step 1003, it is determined whether to keep performing a fine adjustment of the optical path lengths. When the optical path length adjustment and the evaluation of a degree of interference are repeatedly performed and it is determined that the degree of interference is adequate, the procedure transitions from step 1003 to step 1004. In step 1004, a shift amount of a Bragg wavelength due to a temperature change is generated from a storage device such as a disk.

In a case where a temperature changes in an FBG, the Bragg wavelength also changes since an effective refractive index depends on the temperature. Also, since a grating interval changes due to expansion of glass, the shift amount of the Bragg wavelength is lead from the expression (1) in the following manner.

$$\frac{\partial \lambda_B}{\partial T} = \frac{\partial \lambda_B}{\partial n_{eff}}\frac{\partial n_{eff}}{\partial T} + \frac{\partial \lambda_B}{\partial \Lambda}\frac{\partial \Lambda}{\partial T} = 2n_{eff}\Lambda\left(\frac{\partial n_{eff}}{\partial T}\cdot\frac{1}{n_{eff}} + \frac{\partial \Lambda}{\partial T}\cdot\frac{1}{\Lambda}\right)$$ [Math 10]

Here, when $(\partial n_{eff}/\partial T)(1/n_{eff})=\zeta$ and $(\partial \Lambda/\partial T)(1/\Lambda)=\alpha$, the expression (11) is acquired.

$$\Delta\lambda_{BT}=\lambda_B(\zeta+\alpha)\Delta T$$ [Math 11]

Here, $\Delta\lambda_{BT}$ is a Bragg wavelength shift amount due to a temperature change, $\zeta$ is a temperature coefficient of a refractive index, and $\alpha$ is a linear expansion coefficient of an optical fiber. For example, in a case where the Bragg wavelength is 1550 nm, temperature sensitivity is expressed by the expression (12) and is around 9.5 pm/° C.

$$\frac{\Delta\lambda_{BT}}{\Delta T} = \lambda_B(\zeta+\alpha)$$ [Math 12]

Then, from reflection center wavelength measurement data of the FBG sensor unit 132 which data is transferred from the spectrum detection unit, Bragg wavelength data at a temperature at which measurement is performed and Bragg wavelength data of the FBG sensor unit 132 in a case where there is no deformation (deformation amount is zero) are read and subtraction is performed. A value from which a change amount is subtracted is calculated as an amount of change in the Bragg wavelength of the FBG sensor unit 132 which change is due only to a deformation of an object to be inspected. Then, in step 1005, from the expression (13) that is a relational expression of deformation and an amount of change in a Bragg wavelength, a deformation at a predetermined place of a man-made structure is measured and a state of the man-made structure is grasped, whereby estimation of a life or determination of a schedule of repair construction is performed.

$$\Delta\lambda_B=\lambda_B(1-P_e)\epsilon_e$$ [Math 13]

Here, $\Delta\lambda_B$ is a Bragg wavelength shift amount due to a deformation by a load in a fiber axis direction, $P_e$ is a photoelastic coefficient indicating contribution of a refractive index change due to deformation, and $\epsilon_e$ is a deformation by a load in the fiber axis direction. For example, when the Bragg wavelength is 1550 nm, deformation sensitivity is expressed by the expression (14) and a wavelength shift in 1με (deformation in which optical fiber having 1 m is extended for 1 μm) is around 1.2 pm.

$$\frac{\Delta\lambda_{B\varepsilon}}{\varepsilon_e} = \lambda_B(1-P_e)$$ [Math 14]

The above are a method, of the present embodiment, of multiplexing and amplifying signal light and reference light reflected by FBGs arranged in each measurement place, generating a plurality of pieces of interference light with different phase relationships, and amplifying the signal light, a procedure thereof, and a main configuration of a system including an optical fiber including a plurality of core wires arranged in parallel.

According to the procedure in FIG. 10, a deformation amount is actually calculated by compensation of a temperature change amount based on a measurement value by utilization of a sensor of the present invention. More specifically, first, in the spectrum detection unit, a peak value of a Bragg wavelength is calculated from Bragg wavelength data at each time which data is measured with respect to one FBG sensor unit 132. Here, the peak value of the Bragg wavelength is a median of a wavelength on a short wave side and a wavelength on a long wave side, intensity of these wavelengths in a spectrum of reflection light of the FBG sensor unit 132 being decreased for 3 dB from a peak wavelength. Center wavelength data related to the reflection light of the FBG sensor unit 132 which data is transferred from the spectrum detection unit is stored in the storage unit. As a spectrum analysis system, for example, a swept superheterodyne system used in a spectrum analyzer is used. Also, when real-time measurement is necessary, fast Fourier transform may be executed as a spectrum detection system.

Figure 22:
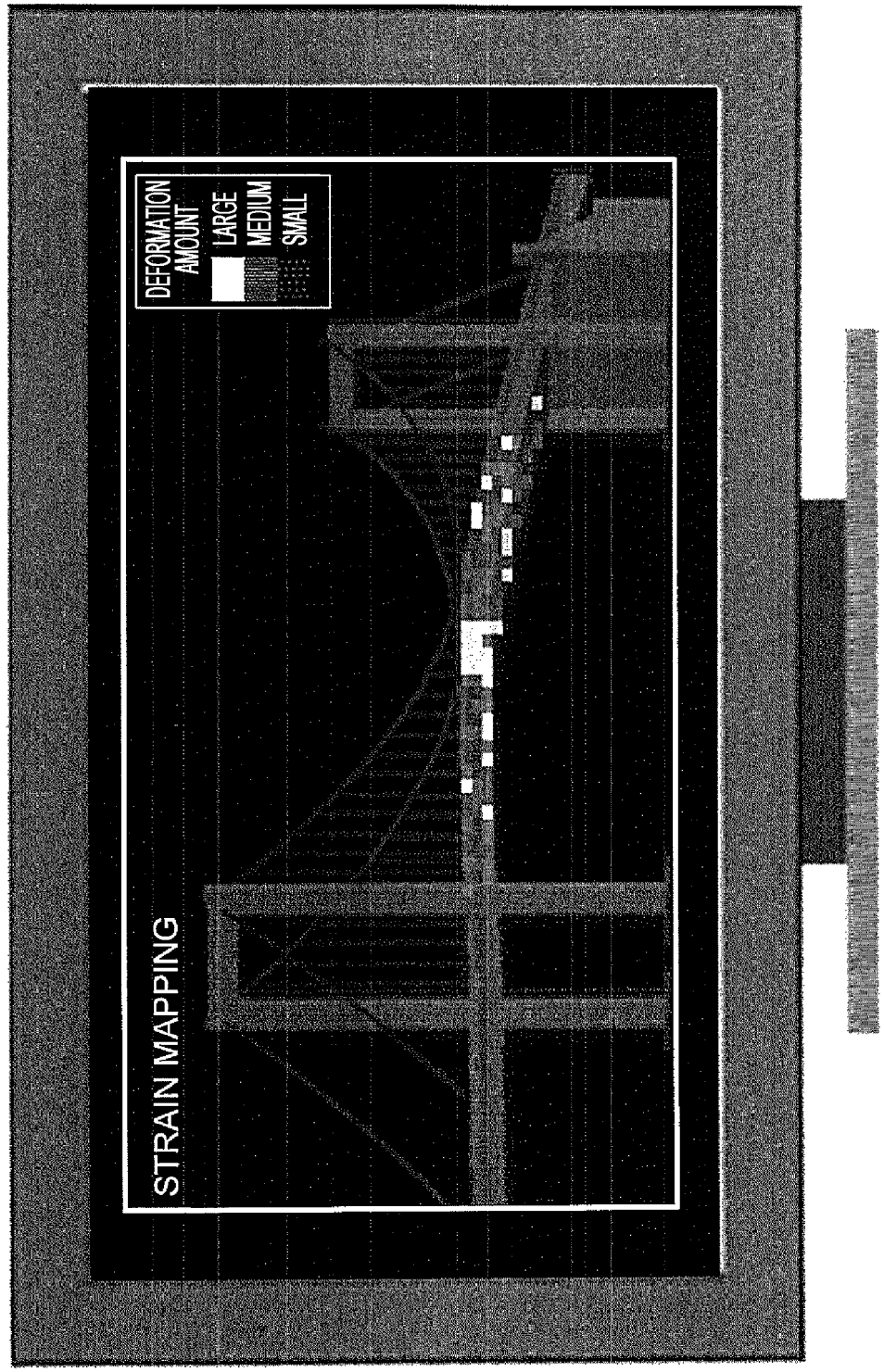
FIG. 22 is a view illustrating an example of a distribution condition of a deformation of a bridge displayed on an output screen of an optical fiber sensor device.

Then, first, a Bragg wavelength change due to a temperature change is calculated in order to eliminate a shift amount of the Bragg wavelength due to a temperature from measurement data and to measure only a deformation amount. More specifically, an average shift amount is calculated from Bragg wavelength variation signal data acquired at certain time t and Bragg wavelength signal data acquired before/after the Bragg wavelength variation signal data with adequate deviation in measurement time. Here, the calculated shift amount is a shift amount of a Bragg wavelength corresponding to a temperature change. Here, for example, when a temperature change is for 30 minutes or longer, a measurement interval is set to 30 minutes or longer, and the Bragg wavelength variation signal data is averaged and an average shift amount is calculated. Then, the calculated average shift amount is subtracted from a Bragg wavelength (center wavelength reference value) of the FBG sensor unit which wavelength is previously measured and stored in the storage unit and a deformation amount is calculated. By the above method, it is possible to separate only a shift amount due to a temperature from the measurement data. Based on a deformation amount of each FBG sensor unit which amount is separated in such a manner, for example, a distribution condition of a deformation such as what is illustrated in FIG. 22 is displayed on the output unit 160, whereby it is possible to perform a comprehensive structure analysis of a man-made structure such as a bridge. By utilization of this, it is possible to estimate an initial trouble of the man-made structure and to effectively specify a place to be repaired/reinforced. Thus, it is possible to prevent a disaster such as a collapse of a bridge with a minimum construction cost.

Note that detection of a trouble of a broken wire due to breaking of an optical fiber itself is performed by detection of Fresnel reflection light in a time division system when light is emitted from the inspection light generation unit to the optical fiber. Here, the Fresnel reflection is reflection generated by a sudden change in a refractive index at a connection point or the like and is generated due to a difference between a refractive index of a fiber and a refractive index of the air when an optical fiber is broken. In this case, since it is possible to specify an approximate position of breaking of the optical fiber by a period of time elapsed from entrance of light from a light source to reception of the Fresnel reflection light, for example, it is possible to easily find a place where the optical fiber is cut accidentally in construction or the like and to reduce time of repairing operation. Also, since it is possible to easily find a place where the optical fiber is broken due to temporal deterioration or the like, determination can be promptly made whether to perform repairing by adhesion or to lay a new optical fiber according to a state of the broken place, for example. In such a manner, by utilization of this optical monitoring system, optical testing of an optical fiber with light emitted from the inspection light generation unit is performed as needed, whereby it is possible to monitor a trouble related to an optical transmission system. Also, the optical fiber sensor device of the present embodiment has a function of notifying a user of a state such as breaking of an optical fiber with an alarm when the Fresnel reflection light is detected.

Second Embodiment

Figure 11:
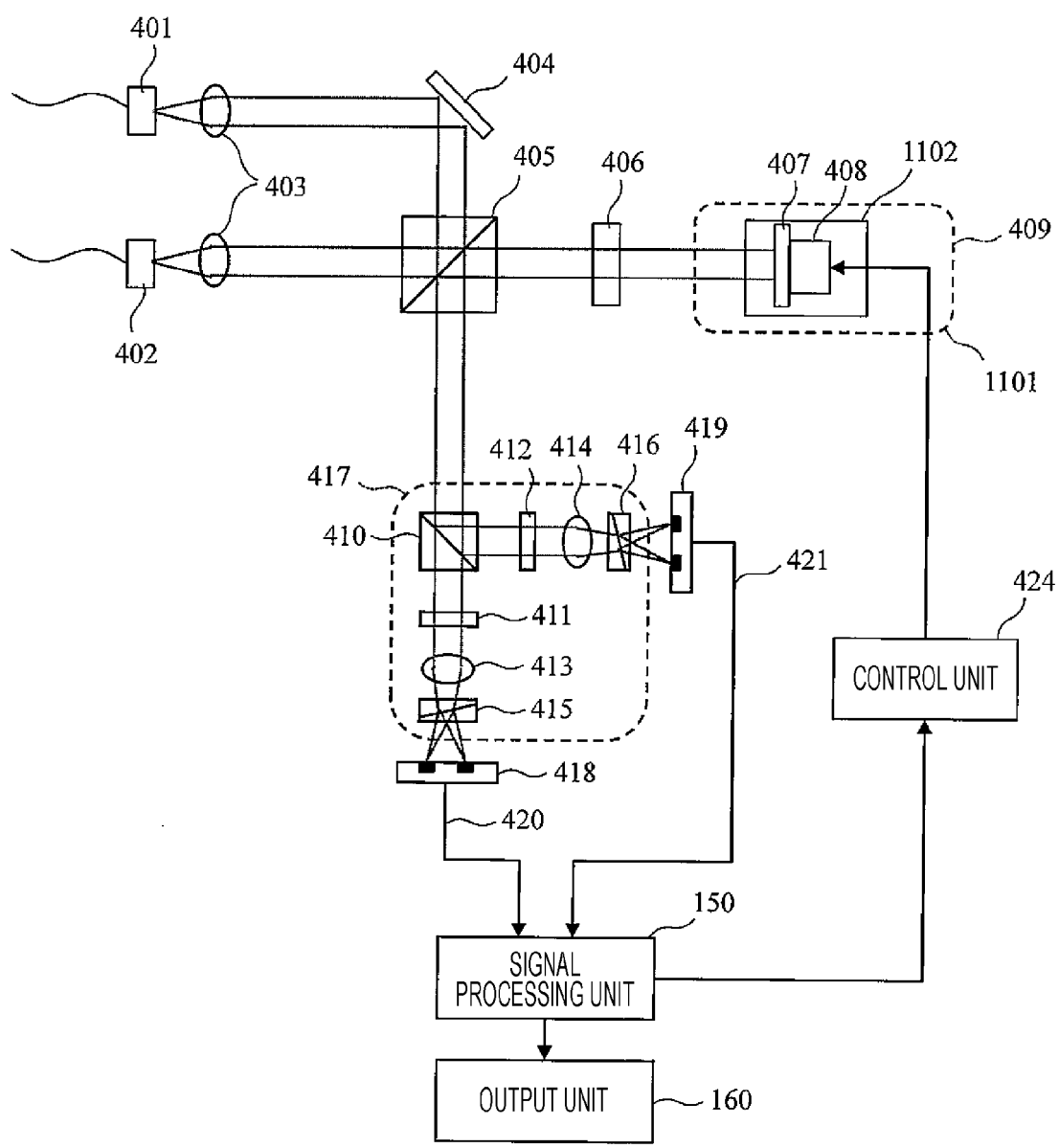
FIG. 11 is a schematic view illustrating an embodiment of an optical fiber sensor device of the present invention.

FIG. 11 is a schematic view illustrating a different embodiment of an optical fiber sensor device of the present invention. Note that the same reference sign is assigned to a part identical to that illustrated in FIG. 4 and a detail description thereof is omitted. An optical fiber sensor having a structure similar to that of the first embodiment is used.

In the present embodiment, a structure up to generation of interference light by multiplexing of signal light emitted from a signal-light propagating optical fiber and reference light emitted from a reference-light propagating optical fiber is similar to that of the first embodiment. However, since a coarse adjustment corresponding function is included as an optical length adjustment unit in addition to a piezoelectric element for a fine adjustment, there is a difference from the first embodiment in a point that a mirror 407 and a piezoelectric element 408 are arranged on a moving stage 1102. A procedure of an optical path length adjustment of the present embodiment is different only in a point that the moving stage 1102 is also used while a position of a mirror is modulated only by a piezoelectric element and an optical path length adjustment is performed in the first embodiment. In the following, a method of measuring signal light of an FBG sensor unit arranged at a distance by performing an adjustment in such a manner that an optical path length of reference light becomes substantially equivalent to that of signal light and by generating interference light even in a case where the optical path lengths of the signal light and the reference light are equal to or longer than a coherence length will be described.

Figure 12:
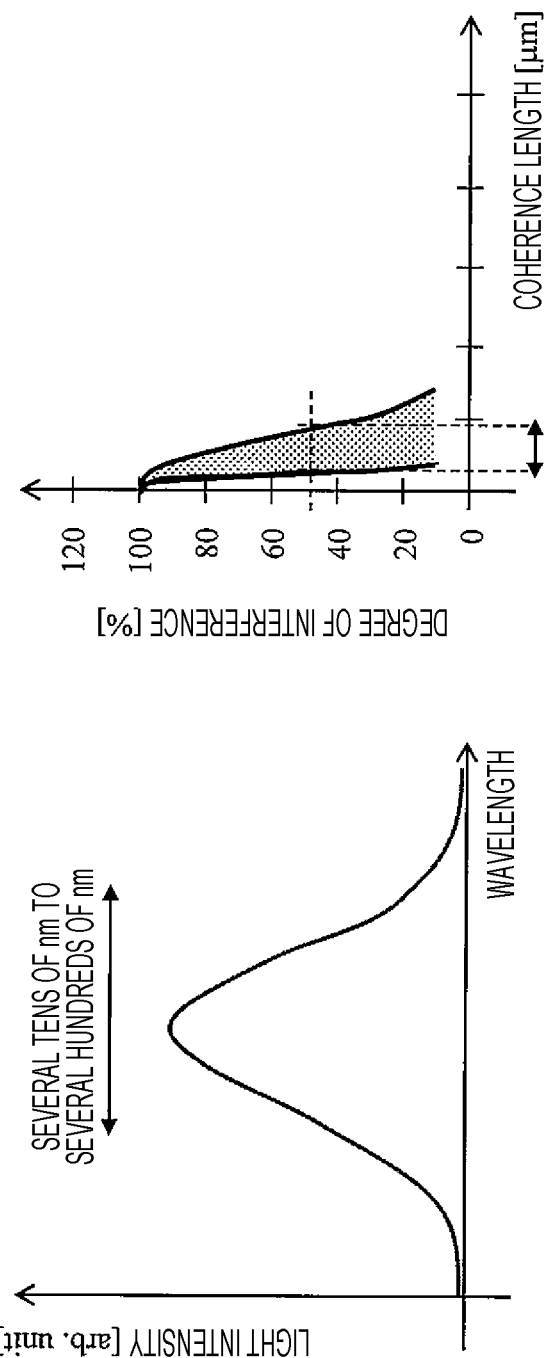
FIG. 12 is a view illustrating a property of a light source.

In the present embodiment, as illustrated in FIG. 12, a broadband light source that is a low-coherence light source such as super continuum (SC) light or a super luminescent diode (SLD) is used. A coherence length of the broadband light source is a several micrometers to a several tens of micrometers. In amplification of a signal, for interference with a multiplexed wave of signal light and reference light, a fine adjustment is performed after a coarse adjustment of an optical path length. Here, the coarse adjustment indicates that a moving distance is longer than that in the fine adjustment (moving distance in nanometer to micrometer order).

Figure 13:
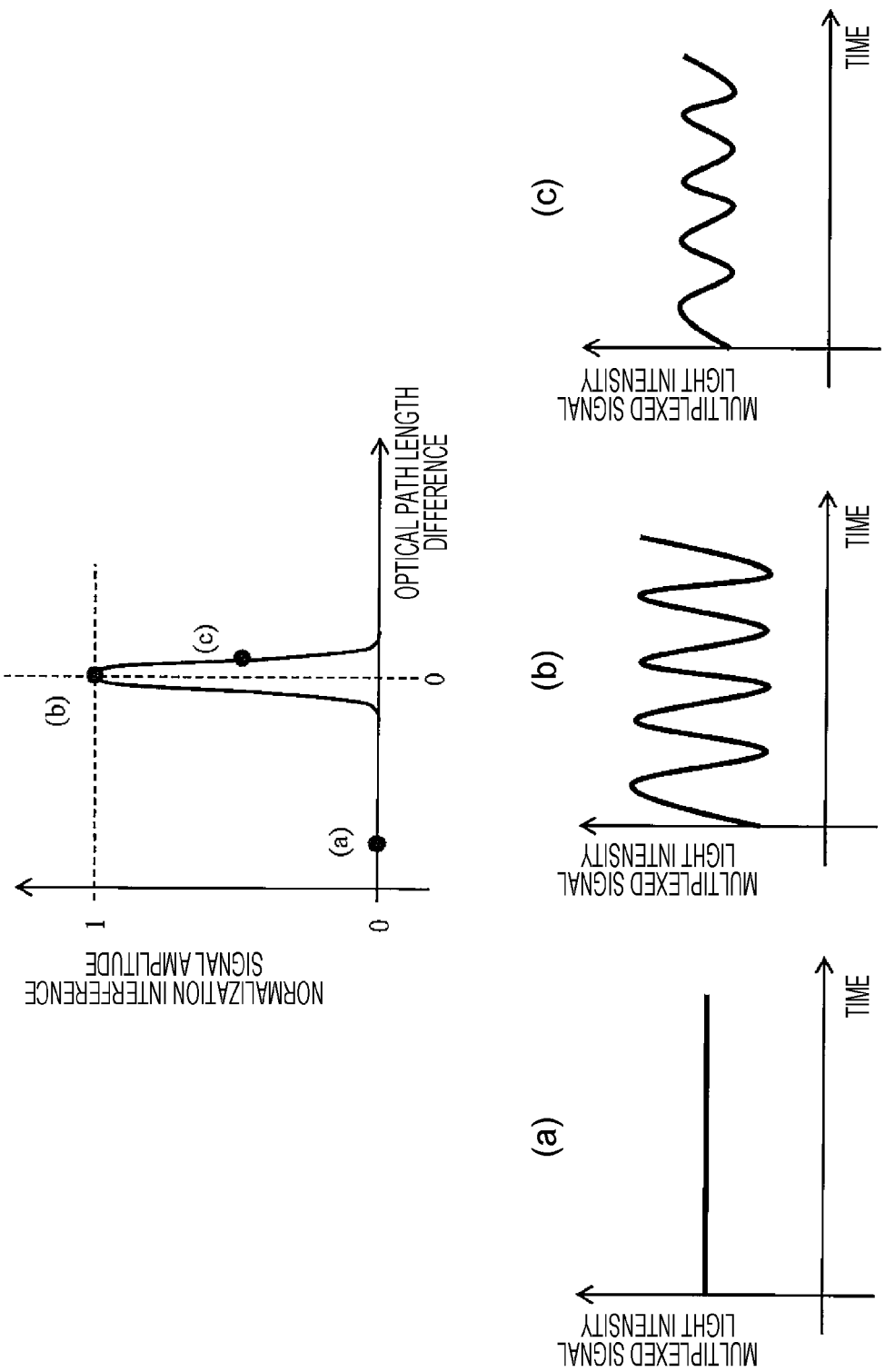
FIG. 13 is a view illustrating an example of an optical path length difference between signal light and reference light and amplitude of an interference signal.

FIG. 13 is a view illustrating an optical path length difference between signal light and reference light and amplitude of interference signal light in the present embodiment using a light source with a short coherence length. In the present embodiment, a light source with a short coherence length is used. Thus, in order to make signal light and reference light interfere with each other, it is necessary to adjust an optical path length difference therebetween to be in a coherence length. In each of FIG. 13(a), FIG. 13(b), and FIG. 13(c), a result of an optical path length adjustment of the signal light and the reference light in a case where a unit of moving a mirror position by performing fast modulation of the mirror position with a piezoelectric element and stage driving is illustrated. As illustrated in FIG. 13(a), an optical path length difference between the signal light and the reference light is equal to or larger than the coherence length, an interference signal is not detected by a measuring device such as an oscilloscope and the signal light and the reference light are simply added to each other. After confirmation of an interference signal illustrated in FIG. 13(c) by a sweep of a stage position, a fine adjustment of an optical path length is performed with a piezoelectric element and a signal in FIG. 13(b) is confirmed.

Figure 15:
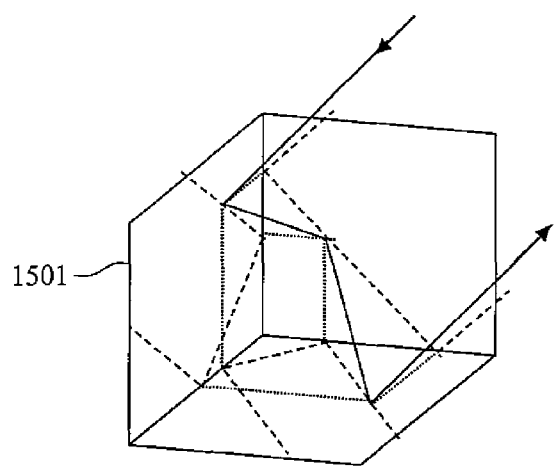
FIG. 15 is a view illustrating a relationship between incident light and reflection light in a corner cube prism.

Also, a corner cube prism 1501 may be used instead of a planer mirror. FIG. 15 is a view for describing that pieces of light incident to a corner cube prism are reflected in the same direction. An incident light beam is basically reflected three times and reflected on all three adjacent surfaces. A solid line in the drawing indicates a light beam, a broken line indicates projection of the light beam to each surface, and a dotted line is an auxiliary line indicating a reflection position. The projection of the light beam on each surface forms a part of a parallelogram and it is understood, from a symmetric property thereof, that pieces of reflected light are reflected in the same direction. In this case, since a locus of reference light reflected by the corner cube prism. 1501 does not change even when the corner cube prism 1501 is inclined because of stage driving, it is possible to prevent a decrease in interference efficiency of the signal light and the reference light. Also, it is possible to prevent a decrease in an SNR due to a deviation in an optical axis of the reference light.

Figure 14:
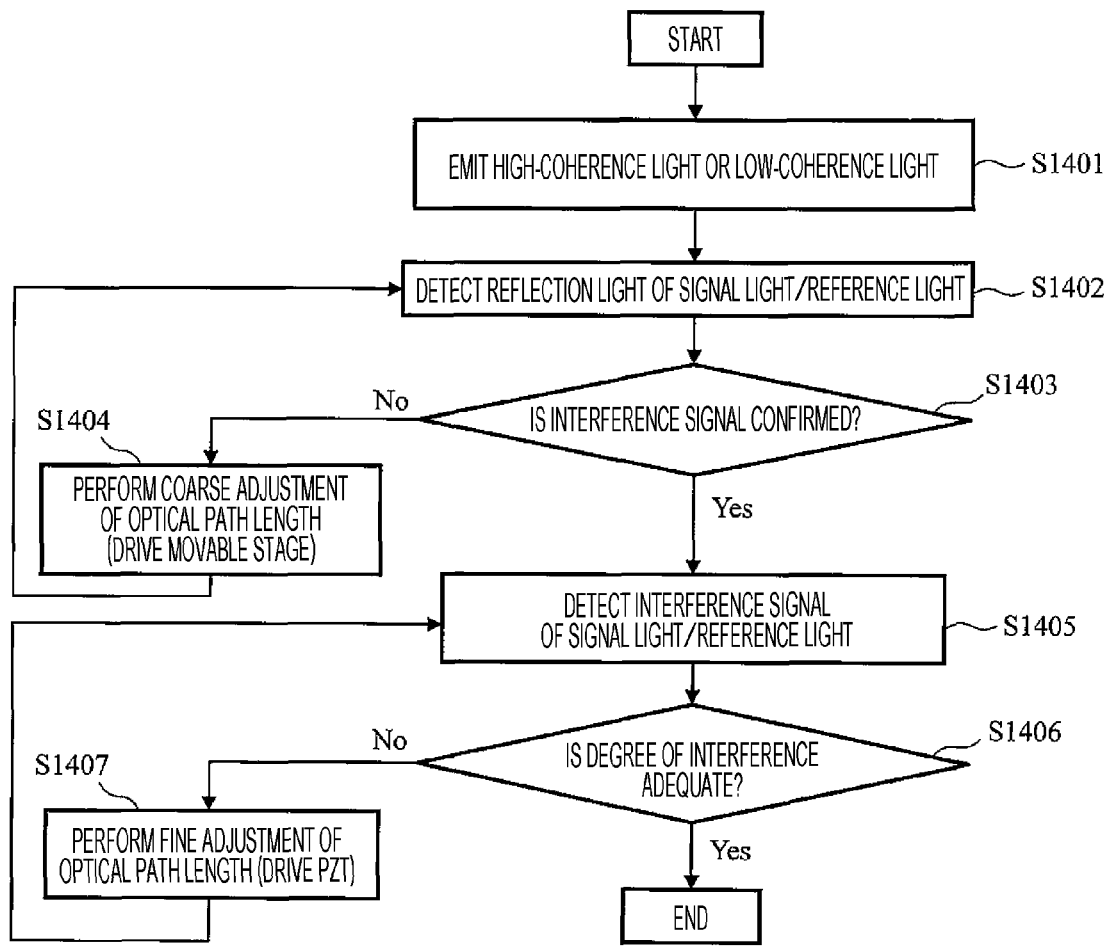
FIG. 14 is a flowchart illustrating a procedure of an optical path length adjustment in a case where a low-coherence light source is used.

FIG. 14 is a flowchart illustrating an example of a procedure of an optical path length adjustment in a case where a low-coherence light source is used. First, in step 1401, current is applied to the light source and a laser light is emitted. The laser light is supplied to a signal-light propagating core wire and a reference-light propagating core wire of an optical fiber sensor. In the present embodiment, a broadband light source (low-coherence light) is used. In step 1402, reflection light of signal light and reference light from the optical fiber sensor is measured. In next step 1403, it is confirmed whether interference light is generated from the signal light and the reference light. When it is not confirmed, a coarse adjustment by stage driving is performed in step 1404 in such a manner that optical path lengths of the signal light and the reference light become equivalent to each other. Here, it is determined whether the interference light is generated based on existence of a standing wave in a multiplexed signal. In step 1402, a standing wave in the interference light after the coarse adjustment is evaluated again. In step 1403, it is determined whether a coarse adjustment of the optical path lengths is to be kept performed. When the coarse adjustment of the optical path lengths and confirmation of a standing wave are repeatedly performed and the standing wave is confirmed, the procedure transitions from step 1403 to step 1405.

In step 1405, an interference signal of the signal light and the reference light is detected. In step 1406, it is determined whether a degree of interference between the signal light and the reference light is adequate. When it is determined that the degree is not adequate, a piezoelectric element is driven and a fine adjustment is performed in such a manner that a difference between the optical path lengths of the reference light and the signal light becomes substantially 0 in step 1407. Here, the determination whether the degree of interference is adequate is performed based on amplitude of the interference light signal and the optical path lengths are adjusted in such a manner that an amplitude value becomes 90% or more of a maximum value or preferably becomes the maximum value. In step 1406, a degree of interference of the interference light an optical path length of which is adjusted is evaluated again and it is determined whether to keep performing the fine adjustment of the optical path length. When the optical path length adjustment and the interference light evaluation are repeatedly performed and it is determined that the degree of interference is adequate, the optical path length adjustment is ended.

In such a manner, since it is possible to amplify signal light by an adjustment of an optical path length even in a case where low coherence light is used, it is possible to improve an SNR of an FBG sensor similarly to the first embodiment.

In the present embodiment, the broadband light source (low-coherence light source) is used. However, a high-coherence light source may be used. In such a case, a coarse adjustment function of an optical path length adjustment is not used and only a fine adjustment of an optical path length is performed. A method of the present embodiment can be applied to a different embodiment and a similar effect can be acquired in each embodiment.

Third Embodiment

In the present embodiment, a case where a plurality of FBGs with different Bragg wavelengths is included in an optical fiber sensor including a plurality of core wires arranged in parallel will be described. Since a part that is not modified from the first and second embodiments is equivalent to the first and second embodiments, a detailed description thereof is omitted.

Figure 16:
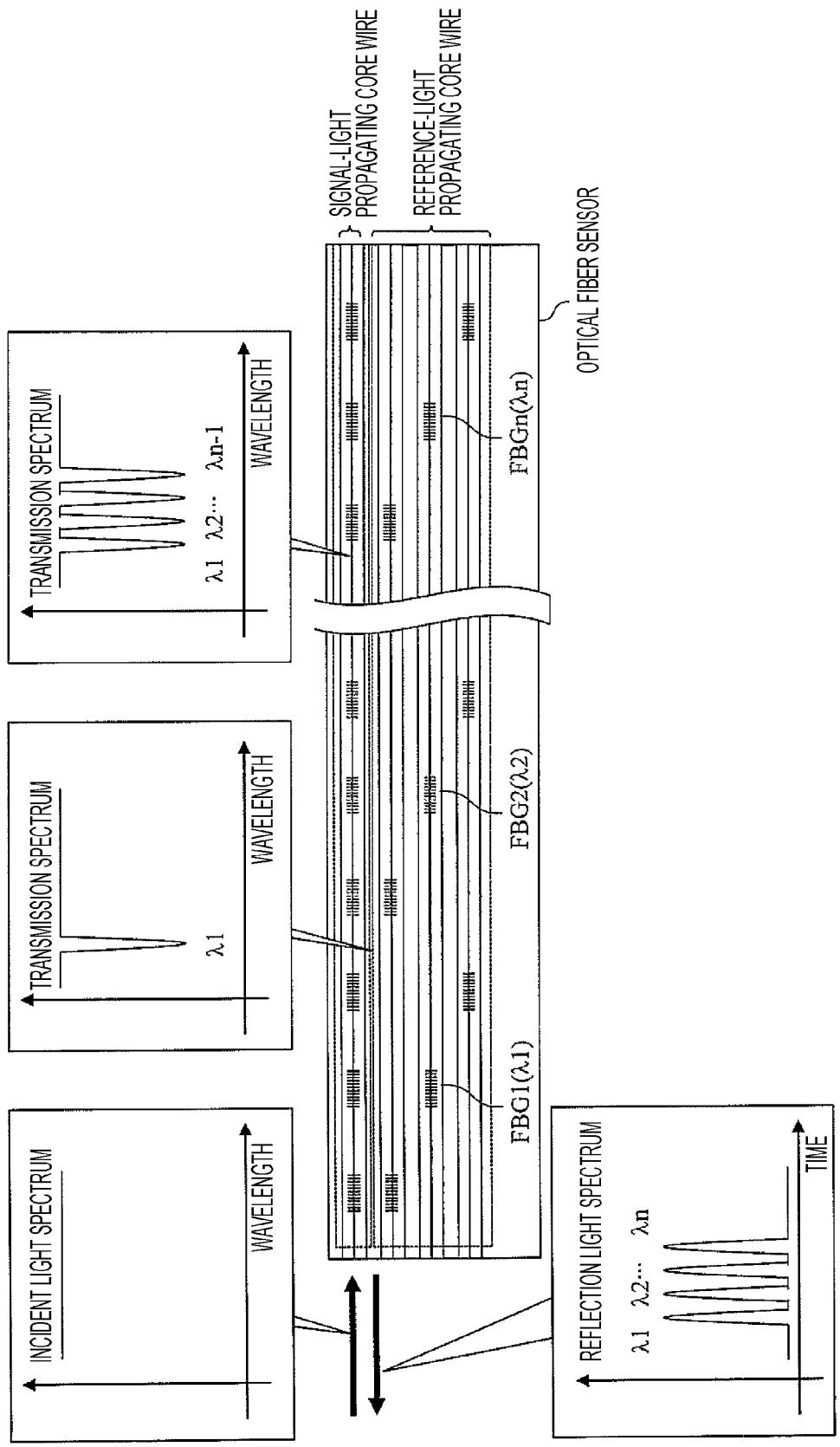
FIG. 16 is a schematic view illustrating an example of an optical fiber sensor including a plurality of FBGs with different Bragg wavelengths.

In each of the first and second embodiments, an FBG with an identical Bragg wavelength is arranged in each measurement point of the signal-light propagating core wire and the reference-light propagating core wire, signal light is amplified by interference with reflection light (signal light and reference light) from each FBG, and deformation is measured. On the other hand, it is also possible to include FBGs with different wavelengths in a signal-light propagating core wire and a reference-light propagating core wire and to amplify signal light. FIG. 16 is a schematic view illustrating an example of an optical fiber sensor in which a plurality of FBGs with different Bragg wavelengths is arranged.

In the present embodiment, an SLD with a wide wavelength band is used as a light source. Light emitted from the light source is split, through an optical branching device 120, into at least one piece of signal light and a remaining piece of reference light and the split light is supplied to a plurality of core wires in an optical fiber sensor 130. In a signal-light propagating core wire and a reference-light propagating core wire, FBGs with different Bragg wavelengths are included. Here, in order to make signal light and reference light, which are reflected at the same measurement position, interfere with each other, FBGs with an identical Bragg wavelength are provided in FBG sensor units in a signal-light propagating core wire and a reference-light propagating core wire at the same measurement position. For example, as illustrated in FIG. 16, when an FBG to an $FBG_n$ having different Bragg wavelengths $\lambda_1$ to $\lambda_n$ are included in the signal-light propagating core wire, light in which the wavelength $\lambda_1$ is lacked enters the $FBG_2$ as light propagated from the $FBG_1$ to the $FBG_2$. Also, as light propagated from the $FBG_{n-1}$ to the $FBG_n$, light in which the wavelengths $\lambda_1, \lambda_2, \ldots$ and $\lambda_{n-1}$ are lacked enters the $FBG_n$. Since the wavelength $\lambda_n$ of the $FBG_n$ does not overlap with $\lambda_1$ to $\lambda_{n-1}$, the $FBG_n$ reflects reflection light of $\lambda_n$ and makes the light enter a homodyne detector through an optical branching filter. The FBG reflection light received by the wave detector becomes a spectrum having peaks at $\lambda_1$, $\lambda_2, \ldots$ and $\lambda_n$. For example, when an SLD with a spectrum width of around 40 nm is used, in a case where FBG peak wavelengths are deviated by around 5 nm in such a manner that Bragg wavelengths do not overlap with each other in a utilization range in generation of deformation, it is possible to provide eight different Bragg wavelengths in one fiber. In the present embodiment, similarly to the first and second embodiments, the reflected signal light and reference light are made to interfere with each other and a change in a wavelength of the amplified signal light is measured by a detector such as a spectrum analyzer, whereby deformation is measured.

A signal is actually amplified by homodyne detection by utilization of an optical fiber sensor, in which FBGs with different Bragg wavelengths are provided, and an increase in a distance of an optical fiber sensor device is examined. In the present embodiment, three different FBGs with Bragg wavelengths being 1550 nm, 1555 nm, and 1560 nm are arranged in the signal-light propagating core wire in a manner illustrated in FIG. 16. Here, the FBGs are arranged at intervals of 2.5 km. Also, FBGs in the reference-light propagating core wire are formed in such a manner that optical path lengths of signal light and reference light become equivalent. Here, reflectivities of the FBGs arranged in the signal-light propagating core wire and the reference-light propagating core wire are respectively 1% and 100%. Similarly to the first and second embodiments, a measurable distance is determined with an SNR=15 dB, with which a peak of Bragg reflection can be detected accurately, as a reference.

Figure 17:
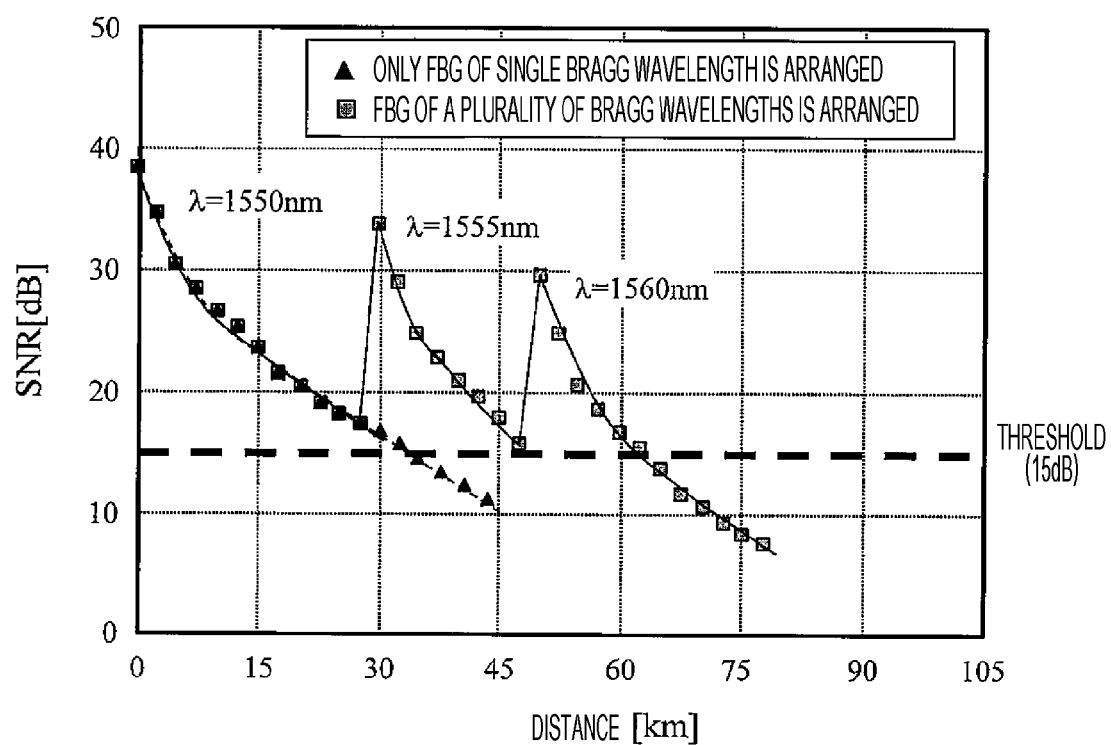
FIG. 17 is a view for comparing a measurable distance of a sensor in which only FBGs with a single Bragg wavelength are arranged and that of a sensor in which FBGs with a plurality of Bragg wavelengths are arranged.

FIG. 17 is a view for comparing a measurable distance of a sensor in which only FBGs with a single Bragg wavelength are arranged and that of a sensor in which FBGs with a plurality of Bragg wavelengths are arranged. In a case where the homodyne detection is applied to an optical fiber sensor device, a measurable distance in an optical fiber sensor having a single Bragg wavelength is 32.5 km. On the other hand, in an optical fiber sensor having a plurality of Bragg wavelengths, it is confirmed that a measurable distance can be increased for around twice to around 62.5 km and that multipoint measurement can be performed. This is because the light source wavelengths other than 1550 nm are propagated in an FBG without a transmission loss when the broadband light source performs transmission through the FBG having the Bragg wavelength of 1550 nm. Actually, it is confirmed that an SNR of the light source wavelength 1555 nm is 35 dB and is adequate for detection of a peak of the Bragg wavelength at a distance at which an SNR of signal light with a wavelength 1550 nm is decreased to 15 dB. Also, at a distance at which the SNR of the light source wavelength 1555 nm reaches 15 dB, an SNR of the light source wavelength 1560 nm is 30 dB. In such a manner, it is possible to increase a distance of the optical fiber sensor device by effectively using a wavelength band of a broadband light source. Also, by an increase of a distance, it becomes possible to provide a device with a price of one sensor being lower than that of a conventional optical fiber sensor device.

In the present embodiment, a broadband light source (low coherence light) with a spectrum width of 40 nm is used. However, even when a broadband light source with a wider spectrum width is used, a similar effect can be acquired. Also, there is no limitation in order of an array of FBGs with different Bragg wavelengths and the FBGs may be arranged randomly as long as a distance of a fiber sensor can be increased. Moreover, a single wavelength-swept light source (high-coherence light source) may be used instead of the broadband light source. A method of the present embodiment can be applied to a different embodiment and a similar effect can be acquired in each embodiment.

Fourth Embodiment

Figure 18:
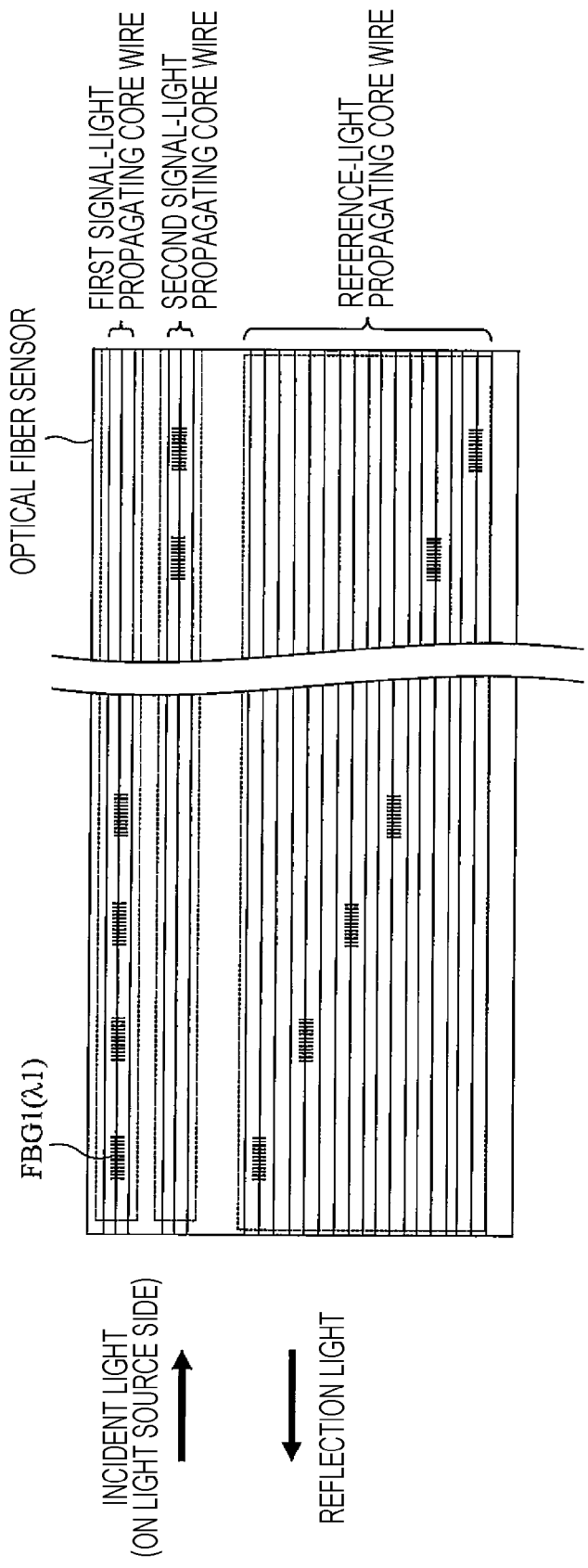
FIG. 18 is a schematic view illustrating an example of an optical fiber sensor including a plurality of signal-light propagating core wires.

FIG. 18 is a schematic view illustrating a different embodiment of an optical fiber sensor of the present invention. In the present embodiment, since a part that is not modified from the above-described embodiments is similar to the first to third embodiments, a detail description thereof is omitted. In the present embodiment, a point that signal light is amplified by splitting of light that is emitted from a light source, supplying of the light to a signal-light propagating core wire and a reference-light propagating core wire, and generation of interference light by multiplexing of reflection light from an FBG sensor provided in each core wire is similar to the first to third embodiments. However, there is a difference from the first to third embodiments in a point that the number of signal-light propagating core wires is increased in an optical fiber sensor including a plurality of core wires arranged in parallel. In the following, a method of increasing a distance of an optical fiber sensor device using an FBG by using two cores for signal light propagation, multiplexing signal light and reference light, and generating interference light will be described and a result will be indicated.

In the present embodiment, a single wavelength-swept light source (high-coherence light source) is used as a light source. Light emitted from a light source is split into two pieces of signal light and a remaining piece of reference light through an optical branching device 120. The split light is supplied to signal-light propagating core wires and a reference-light propagating core wire. For example, as illustrated in FIG. 18, a first signal-light propagating core wire and a second signal-light propagating core wire are prepared as the signal-light propagating core wires and FBGs with an identical Bragg wavelength are arranged in each measurement place of the signal-light propagating core wires. However, arrangement places of the FBGs (distance from end surface of optical fiber on side close to light source) are different in the first signal-light propagating core wire and the second signal-light propagating core wire. In the present embodiment, a case where an FBG of the second signal-light propagating core wire is arranged in a position far from the light source compared to an FBG of the first signal-light propagating core wire is examined. In this case, in signal light propagated in the second signal-light propagating core wire, there is no FBG transmission loss in a distance in which an FBG is provided in the first signal-light propagating core wire. The signal light propagated in the second signal-light propagating core wire can be propagated for a longer distance than signal light propagated in the first signal-light propagating core wire. Thus, it is possible to increase a sensing distance.

A signal is actually amplified by homodyne detection while the number of signal-light propagating core wires in an optical fiber sensor in which a plurality of core wires is arranged in parallel is set to two, and an increase in a distance is examined. First, FBGs are arranged in intervals of 2.5 km in the first signal-light propagating core wire in a range in which a distance is 0 to 27.5 km from an end surface of an optical fiber on a side close to a light source. On the other hand, in the second signal-light propagating core wire, FBGs are arranged in intervals of 2.5 km from a place away for 27.5 km from the end surface of the optical fiber on the side close to the light source. Here, the FBGs in the reference-light propagating core wire are formed in such a manner that optical path lengths of signal light and reference light become equivalent. Here, reflectivities of the FBGs arranged in each signal-light propagating core wire and the reference-light propagating core wire are respectively 1% and 100%. For amplification of signal light, light emitted from the light source is split in such a manner that reference light intensity becomes around four times higher than signal light intensity. Similarly to the first and third embodiments, a measurable distance is determined with an SNR=15 dB, with which a peak of Bragg reflection can be detected accurately, as a reference.

Figure 19:
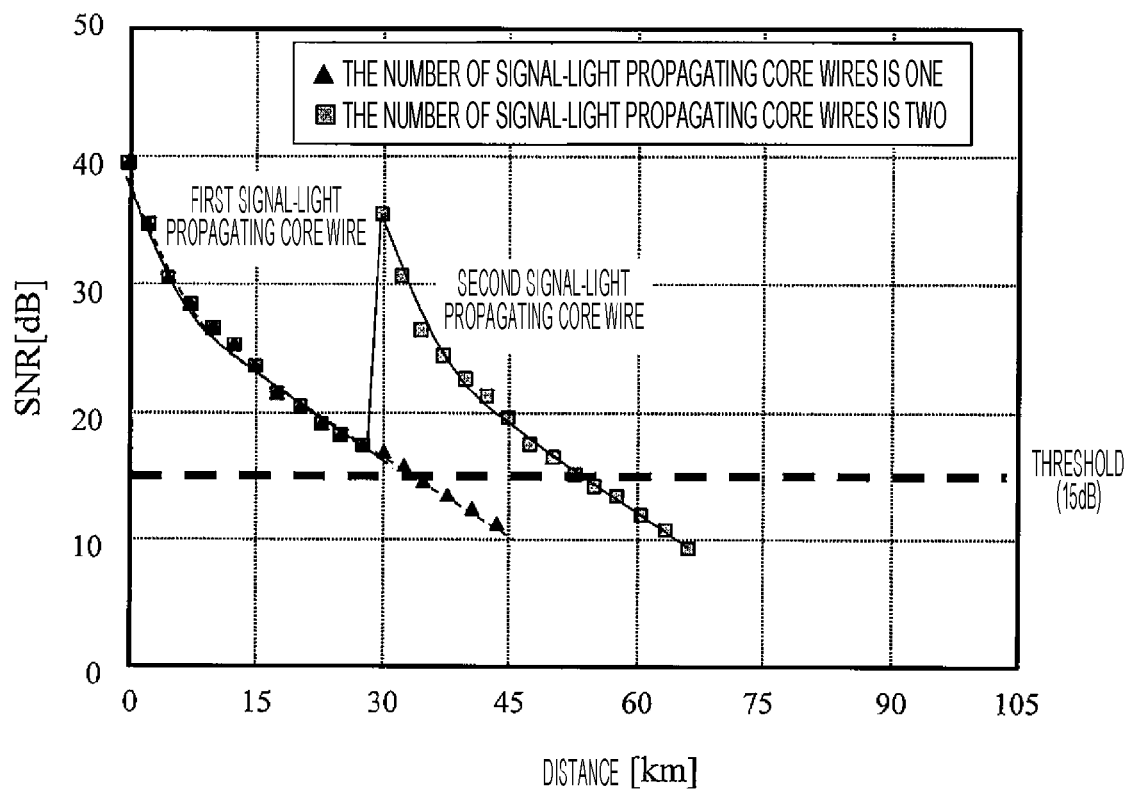
FIG. 19 is a view illustrating an example of a measurable distance of an optical fiber sensor including a plurality of signal-light propagating core wires.

FIG. 19 is a view illustrating an example of a measurable distance of an optical fiber sensor device including a plurality of signal-light propagating core wires. In a case where homodyne detection is applied to an optical fiber sensor device, a measurable distance in an optical fiber sensor including only one signal-light propagating core wire is 32.5 km. On the other hand, it is confirmed that a measurable distance can be increased to around 50 km and that multipoint measurement can be performed in an optical fiber sensor including two signal-light propagating core wires. This is because there is no FBG transmission loss in signal light propagated in the second signal-light propagating core wire in a range from a distance 0 to 27.5 km and an SNR of the signal light propagated in the second signal-light propagating core wire is 36 dB and is adequate for detection of a peak of a Bragg wavelength even at a distance (27.5 km) at which an SNR of signal light propagated in the first signal-light propagating core wire is decreased to 15 dB. In such a manner, a measurable distance becomes long when a plurality of signal-light propagating core wires is provided.

In the present embodiment, a high-coherence light source is used. However, a low-coherence light source may be used and a similar effect can be acquired in this case. Also, the number of signal-light propagating core wires is set to two. However, the number of signal-light propagating core wires may be two or more and an effect similar to that of the present embodiment can be acquired in this case. A method of increasing a distance in the present embodiment can be also applied to a different embodiment and a similar effect can be acquired in each embodiment.

Fifth Embodiment

FIG. 7(b) is a view illustrating a different embodiment of the present invention. In the present embodiment, since a part that is not modified is similar to the first to fourth embodiments, a detail description thereof is omitted. A point that signal light is amplified by splitting of light emitted from a light source, supplying of the light to a signal-light propagating core wire and a reference-light propagating core wire, and generation of interference light by multiplexing of reflection light from an FBG sensor provided in each core wire is similar to the first to fourth embodiments. However, there is a difference from the first to fourth embodiments in a point that an optical fiber in which coupling to one polarization mode to the other polarization mode is controlled by generation of a propagation constant difference between two orthogonal polarization modes in an optical fiber including a plurality of core wires arranged in parallel and polarization maintaining capability is improved is used.

In an polarization maintaining multicore optical fiber used in the present embodiment, for example, a diameter of a clad 703 is 125 µm, a length of a long axis of each of elliptical cores 701 and 702 is 10 µm, a length of a short axis thereof is 2 µm, a relative refractive index difference between a core and a clad is 1%, and a distance between centers of the closest cores is 30 µm. In the polarization maintaining multicore optical fiber, a structural birefringence is generated when a core is elliptical. Thus, by making a linearly polarized wave, which corresponds to a principal polarization axis direction, enter each core included in the optical fiber, it is possible to perform propagation while keeping a polarized state. Also in the present embodiment, light emitted from a light source is split and at least one piece is supplied to a signal-light propagating core wire 702 and the other is supplied to a reference-light propagating core wire 701. Then, reflection light from an FBG sensor provided in each core wire is multiplexed and interference light is generated. Thus, signal light is amplified. Here, for example, propagation light is propagated in an s polarization in the signal-light propagating core wire 702. In the reference-light propagating core wire 701, light is propagated in a p polarization. In such a manner, it is confirmed that it is possible to increase a distance of an FBG sensor and to perform multipoint measurement by multiplexing propagated signal light and reference light and amplifying the signal light similarly to the first to fourth embodiments.

In the present embodiment, an elliptical core-type multicore optical fiber is used as an example. However, shapes of a core part and a clad part, and members of the core part and the clad part may be anything as long as an optical fiber sensor can propagate propagation light while keeping a polarized state thereof and includes a plurality of core wires arranged in parallel. In this case, an effect similar to that of the present embodiment is also acquired. A method of increasing a distance in the present embodiment can be also applied to a different embodiment and a similar effect can be acquired in each embodiment.

Sixth Embodiment

Figure 20:
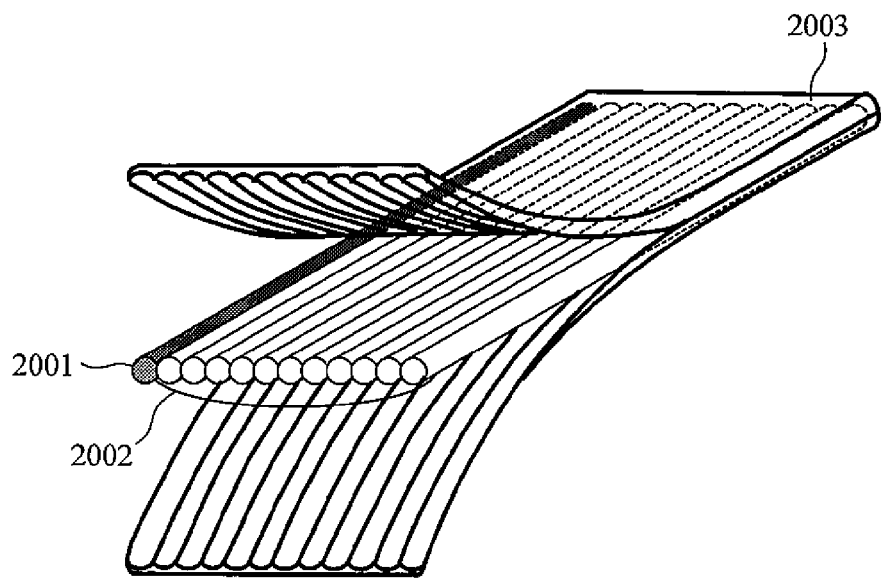
FIG. 20 is a view illustrating an example of an optical fiber including a plurality of core wires arranged in parallel.
Figure 21:
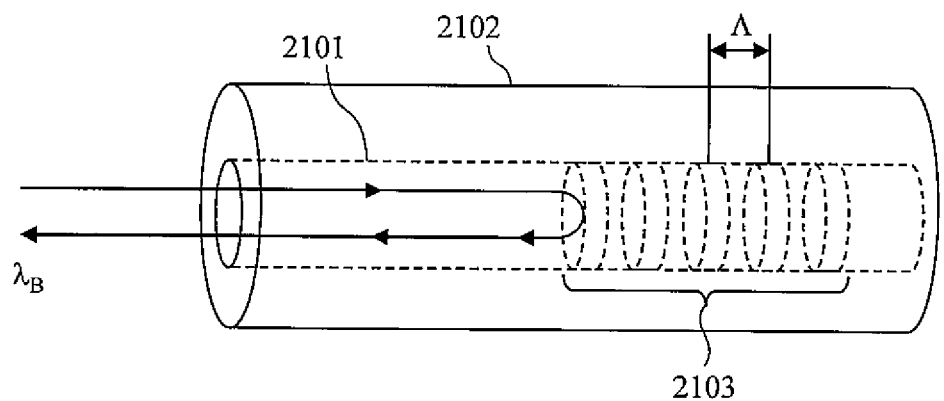
FIG. 21 is a view illustrating a structure of a conventional FBG sensor.

FIG. 20 is a view illustrating a different embodiment of the present invention. In the present embodiment, a case where a kind of an optical fiber is changed in an optical fiber sensor including a plurality of core wires arranged in parallel will be described. Since a part that is not modified is similar to the first to fifth embodiments, a detail description thereof is omitted.

In the present embodiment, as illustrated in FIG. 20, for example, a ribbon optical fiber 2003 in which a plurality of core wires is bundled is used as an optical fiber sensor unit. Also in the present embodiment, light emitted from a light source is split and one piece is supplied to a signal-light propagating core wire 2001 and the other is supplied to a reference-light propagating core wire 2002. Then, reflection light from an FBG sensor provided in each core wire is multiplexed and interference light is generated. Thus, signal light is amplified. As a result, it is confirmed that a measurement distance of a state of a social infrastructure becomes long similarly to the first to fifth embodiments.

Since a ribbon optical fiber is mass-produced for a use of communication and has a lower price than a unique fiber, it is possible to provide optical fiber sensor with a low price. Also, there is an advantage that FBG production in a ribbon optical fiber is easy compared to that in a multicore optical fiber. An optical fiber of the present embodiment can be also applied to a different embodiment and a similar effect can be acquired in each embodiment.

Note that the present invention is not limited to the above embodiments and various modified examples are included. For example, the above embodiments are described in detail to describe the present invention in an easily-understandable manner. The present invention is not necessarily limited to what includes all of the above-described configurations. Also, it is possible to replace a part of a configuration of an embodiment with a configuration of a different embodiment and to add a configuration of a different embodiment to a configuration of an embodiment. Also, with respect to a part of a configuration of each embodiment, a different configuration can be added, deleted, or replaced.

REFERENCE SIGNS LIST

110: inspection light generation unit
111: light source
112: light intensity modulator
113: pulse generator
120: optical branching device
121a: signal-light propagating optical fiber
121b: reference-light propagating optical fiber
130: optical fiber sensor
131: fiber Bragg grating (FBG)
132: FBG sensor unit
133: signal-light propagating core wire
134: reference-light propagating core wire
140: homodyne detection unit 150: signal processing unit
160: output unit

The invention claimed is:

1. An optical fiber sensor device comprising:
    a light source;
    an optical fiber sensor which includes a plurality of core wires arranged substantially in parallel and in which at least one core wire is used for signal light propagation, at least one other core wire is used for reference light propagation, FBG sensor units are provided in a plurality of places in a longitudinal direction, and a pair of FBGs having an identical Bragg wavelength is formed in the signal-light propagating core wire and the reference-light propagating core wire in each of the FBG sensor units;
    an interference optical system configured to multiplex signal light reflected from each of the FBG sensor units through the signal-light propagating core wire and reference light reflected through the reference-light propagating core wire and to generate a plurality of pieces of interference light with different phase relationships;
    a detection unit configured to detect the plurality of pieces of generated interference light; and
    a calculation unit configured to calculate an output of the detection unit and to generate a signal indicating intensity of the signal light.

2. The optical fiber sensor device according to claim 1, wherein the number of FBGs formed in one reference-light propagating core wire is smaller than the number of FBGs formed in one signal-light propagating core wire, and
    a reflectivity of the FBGs formed in the signal-light propagating core wire is lower than a reflectivity of the FBGs formed in the reference-light propagating core wire.

3. The optical fiber sensor device according to claim 1, wherein the number of reference-light propagating core wires is equal to or larger than the number of FBG sensor units, and
    one FBG is formed in one reference-light propagating core wire.

4. The optical fiber sensor device according to claim 1, wherein the light source is a high-coherence light source, and
    an optical path-length adjustment unit configured to adjust an optical path length is included in an optical path of the reference light.

5. The optical fiber sensor device according to claim 1, wherein the light source is a low-coherence light source,
    an optical path-length adjustment unit configured to adjust an optical path length is included in an optical path of the reference light, and
    the optical path-length adjustment unit includes a coarse adjustment unit and a fine adjustment unit.

6. The optical fiber sensor device according to claim 5, wherein the optical path-length adjustment unit first performs an optical path length adjustment with the coarse adjustment unit in such a manner that an interference signal appears due to interference between the signal light and the reference light, and then performs an optical path length adjustment with the fine adjustment unit in such a manner that amplitude of the interference signal is increased.

7. The optical fiber sensor device according to claim 1, wherein the pair of FBGs formed in each of the FBG sensor units is arranged in a range of a coherence length of light emitted from the light source.

8. The optical fiber sensor device according to claim 1, wherein a Bragg wavelength of an FBG formed in a first FBG sensor unit and a Bragg wavelength of an FBG formed in a second FBG sensor unit that is different from the first FBG sensor unit are different from each other.

9. The optical fiber sensor device according to claim 1, further comprising a plurality of signal-light propagating core wires.

10. The optical fiber sensor device according to claim 1, wherein the plurality of core wires arranged in parallel is core wires of a multicore fiber or a ribbon fiber.

11. The optical fiber sensor device according to claim 1, wherein the signal-light propagating core wire and the reference-light propagating core wire maintain and propagate polarized waves orthogonal to each other.

12. The optical fiber sensor device according to claim 1, wherein the calculation unit calculates and outputs a deformation amount of an object to be measured based on intensity of the signal light.

* * * * *